United States Patent
Draghicescu et al.

(10) Patent No.: US 10,977,314 B2
(45) Date of Patent: *Apr. 13, 2021

(54) INEXACT SEARCH ACCELERATION

(71) Applicant: Micron Technology, Inc., Boise, ID (US)

(72) Inventors: Paul T. Draghicescu, Seattle, WA (US); Gregory M. Edvenson, Seattle, WA (US); Corey B. Olson, Madison, WI (US)

(73) Assignee: Micron Technology, Inc., Boise, ID (US)

( * ) Notice: Subject to any disclaimer, the term of this patent is extended or adjusted under 35 U.S.C. 154(b) by 571 days.

This patent is subject to a terminal disclaimer.

(21) Appl. No.: 15/670,195

(22) Filed: Aug. 7, 2017

(65) Prior Publication Data

US 2017/0351780 A1    Dec. 7, 2017

Related U.S. Application Data

(63) Continuation of application No. 14/213,495, filed on Mar. 14, 2014, now Pat. No. 9,740,798, which is a continuation-in-part of application No. 14/201,824, filed on Mar. 8, 2014, now Pat. No. 9,734,284.

(60) Provisional application No. 61/790,407, filed on Mar. 15, 2013, provisional application No. 61/790,720, filed on Mar. 15, 2013, provisional application No. 61/940,009, filed on Feb. 14, 2014, provisional application No. 61/940,472, filed on Feb. 16, 2014.

(51) Int. Cl.
*G06F 16/903* (2019.01)

(52) U.S. Cl.
CPC .............................. *G06F 16/90344* (2019.01)

(58) Field of Classification Search
None
See application file for complete search history.

(56) References Cited

U.S. PATENT DOCUMENTS

| | | |
|---|---|---|
| 9,014,989 B2 | 4/2015 | McMillen et al. |
| 9,235,680 B2 | 1/2016 | van Rooyen et al. |
| 9,342,652 B2 | 5/2016 | van Rooyen et al. |
| 9,483,610 B2 | 11/2016 | McMillen et al. |
| 9,519,752 B2 | 12/2016 | van Rooyen et al. |
| 9,529,667 B2 | 12/2016 | Zastrow |
| 9,576,103 B2 | 2/2017 | McMillen et al. |
| 9,576,104 B2 | 2/2017 | van Rooyen et al. |
| 9,679,104 B2 | 6/2017 | van Rooyen et al. |
| 9,792,405 B2 | 10/2017 | van Rooyen et al. |
| 9,858,384 B2 | 1/2018 | van Rooyen et al. |
| 9,898,424 B2 | 2/2018 | van Rooyen et al. |
| 9,953,132 B2 | 4/2018 | van Rooyen et al. |
| 9,953,134 B2 | 4/2018 | van Rooyen et al. |
| 9,953,135 B2 | 4/2018 | van Rooyen et al. |
| 10,068,054 B2 | 9/2018 | van Rooyen et al. |
| 10,083,276 B2 | 9/2018 | van Rooyen et al. |
| 10,210,308 B2 | 2/2019 | van Rooyen et al. |
| 10,216,898 B2 | 2/2019 | McMillen et al. |
| 10,262,105 B2 | 4/2019 | van Rooyen et al. |
| 2014/0236490 A1 | 8/2014 | van Rooyen et al. |
| 2015/0342501 A1 | 12/2015 | Di Natali et al. |
| 2016/0306922 A1 | 10/2016 | van Rooyen et al. |
| 2017/0124254 A1 | 5/2017 | van Rooyen et al. |
| 2018/0173648 A1 | 6/2018 | van Rooyen et al. |
| 2018/0181708 A1 | 6/2018 | van Rooyen et al. |
| 2019/0147981 A1 | 5/2019 | van Rooyen et al. |
| 2019/0172552 A1 | 6/2019 | van Rooyen et al. |
| 2019/0172558 A1 | 6/2019 | van Rooyen et al. |

OTHER PUBLICATIONS

Fernandez et al IEEE (2011) DOI 10.1109/FCCM.2011.55.*

* cited by examiner

*Primary Examiner* — Joseph Woitach
(74) *Attorney, Agent, or Firm* — Nancy R. Gamburd; Gamburd Law Group LLC

(57) ABSTRACT

A system and method are disclosed for inexact search acceleration using reference data. A representative system includes one or more memory circuits storing a plurality of queries and a FM-index of the reference data; and one or more FPGAs configured to select a query; select a substring of the selected query; read a section of the FM-index and calculate a plurality of suffix array intervals for the sub string with a corresponding plurality of prepended characters in a first or next position; read a first or next character in the first or next position of the query and select a suffix array interval for the read first character; determine whether the suffix array interval is valid and whether a beginning of the query has been reached; returning a first search result when the suffix array interval is valid and the beginning of the query has been reached; and returning a second search result that no match of the query with the reference data was found when the suffix array interval is not valid.

26 Claims, 22 Drawing Sheets

FIG. 9A

| I | M | P | S |
|---|---|---|---|
| 0 | 4 | 5 | 7 |

| i | I | M | P | S |
|---|---|---|---|---|
| 0 | 1 | 0 | 0 | 0 |
| 1 | 1 | 0 | 1 | 0 |
| 2 | 1 | 0 | 1 | 1 |
| 3 | 1 | 0 | 1 | 2 |
| 4 | 1 | 1 | 1 | 2 |
| 5 | 1 | 1 | 1 | 2 |
| 6 | 1 | 1 | 2 | 2 |
| 7 | 2 | 1 | 2 | 2 |
| 8 | 2 | 1 | 2 | 3 |
| 9 | 2 | 1 | 2 | 4 |
| 10 | 3 | 1 | 2 | 4 |
| 11 | 4 | 1 | 2 | 4 |

| | |
|---|---|
| I | 11 |
| P | 10 |
| S | 7 |
| S | 4 |
| M | 1 |
| $ | 0̸ |
| P | 9 |
| I | 8 |
| S | 6 |
| S | 3 |
| I | 5 |
| I | 2 |

| S | k | l | [SA INTERVAL] |
|---|---|---|---|
| { } | 1 | 11 | 11 |
| S | 8 | 11 | 4 |
| IS | 3 | 4 | 2 |
| SIS | 9 | 9 | 1 |

| | | | | | | | | | | |
|---|---|---|---|---|---|---|---|---|---|---|
| $ | M | I | S | S | I | S | S | I | P | P | I |
| I | $ | M | I | S | S | I | S | S | I | P | P |
| I | P | P | I | $ | M | I | S | S | I | S | S |
| I | S | S | I | P | P | I | $ | M | I | S | S |
| I | S | S | I | S | S | I | P | P | I | $ | M |
| M | I | S | S | I | S | S | I | P | P | I | $ |
| P | I | $ | M | I | S | S | I | S | S | I | P |
| P | P | I | $ | M | I | S | S | I | S | S | I |
| S | I | P | P | I | $ | M | I | S | S | I | S |
| S | I | S | S | I | P | P | I | $ | M | I | S |
| S | S | I | P | P | I | $ | M | I | S | S | I |
| S | S | I | S | S | I | P | P | I | $ | M | I |

IS 570

{ } 575

SIS 580

S 585

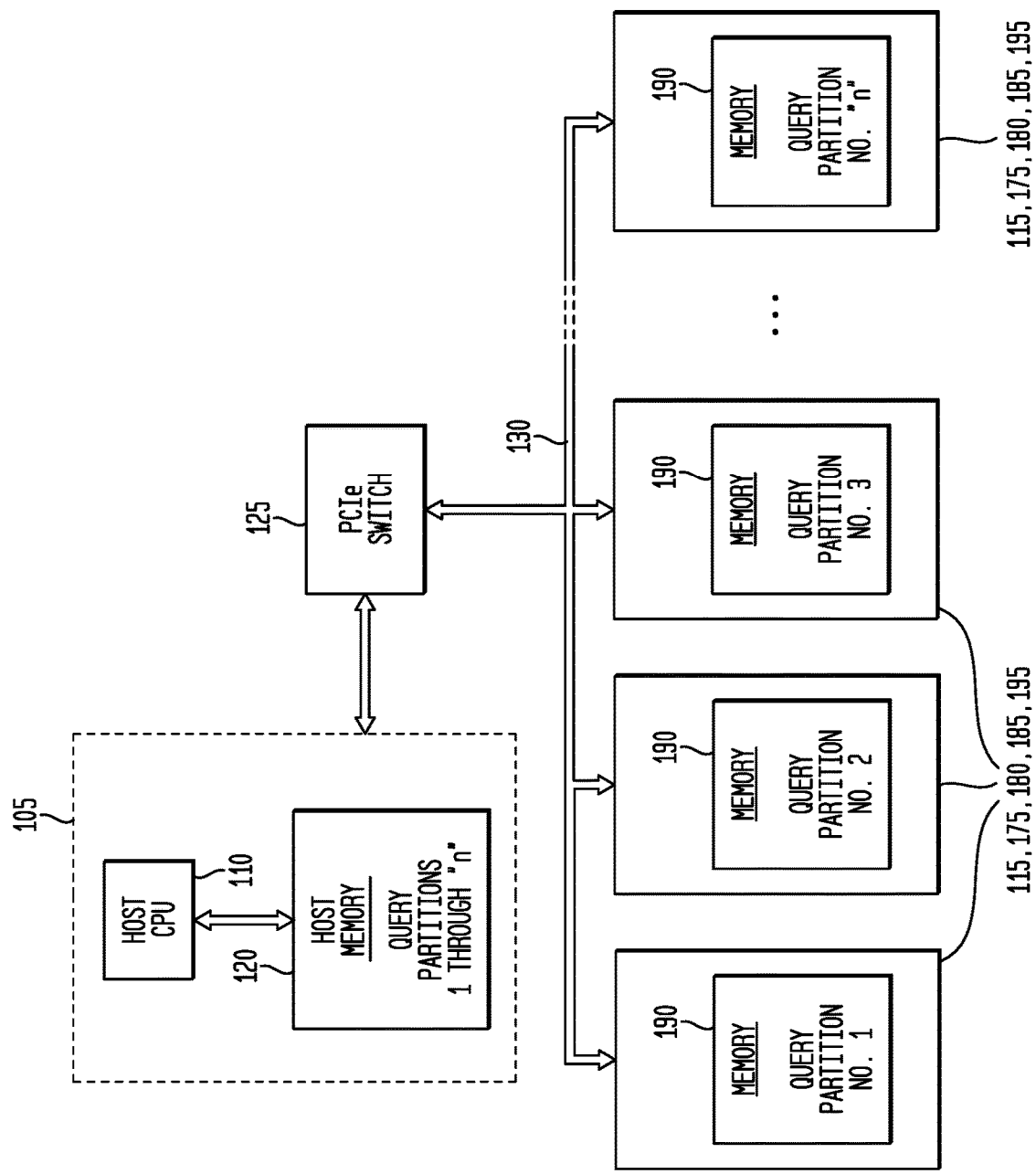

INEXACT SEARCH ACCELERATION

CROSS-REFERENCE TO RELATED APPLICATIONS

This application is a continuation of and claims the benefit of and priority to U.S. patent application Ser. No. 14/213,495, filed Mar. 14, 2014, inventor Paul T. Draghicescu et al., titled "Inexact Search Acceleration", which is a nonprovisional of and, under 35 U.S.C. Section 119, further claims the benefit of and priority to U.S. Provisional Patent Application No. 61/790,407, filed Mar. 15, 2013, inventor Corey B. Olson, entitled "Hardware Acceleration of Short Read Mapping", which is commonly assigned herewith, the entire contents of which are incorporated herein by reference with the same full force and effect as if set forth in their entirety herein, and with priority claimed for all commonly disclosed subject matter.

U.S. patent application Ser. No. 14/213,495 also is a nonprovisional of and further claims priority under 35 U.S.C. Section 119 to U.S. Provisional Patent Application No. 61/790,720, filed Mar. 15, 2013, inventors Paul T. Draghicescu et al., entitled "Inexact Search Acceleration on FPGAs Using the Burrows-Wheeler Transform", which is commonly assigned herewith, the entire contents of which are incorporated herein by reference with the same full force and effect as if set forth in their entirety herein, and with priority claimed for all commonly disclosed subject matter.

U.S. patent application Ser. No. 14/213,495 also is a nonprovisional of and further claims priority under 35 U.S.C. Section 119 to U.S. Provisional Patent Application No. 61/940,009, filed Feb. 14, 2014, inventors Jeremy B. Chritz et al., entitled "High Speed, Parallel Configuration of Multiple Field Programmable Gate Arrays", which is commonly assigned herewith, the entire contents of which are incorporated herein by reference with the same full force and effect as if set forth in their entirety herein, and with priority claimed for all commonly disclosed subject matter.

U.S. patent application Ser. No. 14/213,495 also is a nonprovisional of and further claims priority under 35 U.S.C. Section 119 to U.S. Provisional Patent Application No. 61/940,472, filed Feb. 16, 2014, inventors Jeremy B. Chritz et al., entitled "System and Method for Independent, Direct and Parallel Communication Among Multiple Field Programmable Gate Arrays", which is commonly assigned herewith, the entire contents of which are incorporated herein by reference with the same full force and effect as if set forth in their entirety herein, and with priority claimed for all commonly disclosed subject matter.

U.S. patent application Ser. No. 14/213,495 is a continuation-in-part of and further claims priority to U.S. patent application Ser. No. 14/201,824, filed Mar. 8, 2014, inventor Corey B. Olson, entitled "Hardware Acceleration of Short Read Mapping for Genomic and Other Types of Analyses", which further claims priority to and the benefit of U.S. Provisional Patent Application No. 61/940,472, U.S. Provisional Patent Application No. 61/940,009, U.S. Provisional Patent Application No. 61/790,407, and U.S. Provisional Patent Application No. 61/790,720 as referenced above, which are commonly assigned herewith, the entire contents of which are incorporated herein by reference with the same full force and effect as if set forth in their entireties herein, and with priority claimed for all commonly disclosed subject matter.

FIELD OF THE INVENTION

The present invention relates generally to computing systems, and more specifically to the use of configurable logic circuits such as FPGAs to accelerate inexact searching, such as for genomic and other types of analyses.

BACKGROUND

Search is a widespread area, with many more applications beyond internet searching using search engines such as Bing, Yahoo or Google. For example, meteorologists have been searching for weather patterns, chemists have been searching for the weights and types of atoms contained in an unknown substance, and biologists have been searching for patterns and mutations in our genetic code and comparing those patterns with the genetic sequences of other organisms.

Many search application typically involve searching through a very large data set, referred to as a "reference", such as the set of webpages on the internet. The item that is being searched for, referred to as the "query", may or may not match the reference exactly at some point. Indeed, the most interesting cases tend to be those in which the query is close to the reference but does not match the reference exactly (e.g., as a simple example, a search on the internet for "Super Computer" returns links to pages containing the word "Supercomputer"). To provide accurate search results, therefore, it is important to support inexact matching of the query to the reference. Inexact matching tends to require a brute-force approach, resulting in much longer search times in a typical computing environment. In many cases, researchers are searching a very large reference database, or many databases, millions or even billions of times. As a result, the speed or runtime of the searching is of paramount importance.

Another significant area for searching is genetic analysis. Genetic (DNA) sequencing is revolutionizing many aspects of biology and medicine, and creating an entirely new field of personalized medicine, particularly suited for analysis of cancers and determinations of corresponding individualized treatment options. The cost of sequencing has dropped considerably, while new sequencing machines continue to increase the throughput of DNA sequencing, allowing sequencing technology to be applied to a wide variety of disparate fields.

In the process of genetic sequencing, genetic material is typically cleaved at numerous chromosomal locations into comparatively short DNA fragments, and the nucleotide sequence of these comparatively short DNA fragments is determined. The comparatively short DNA fragments are typically a few tens to hundreds of bases in length, and are referred to in the field as "short reads". Such sequencing can be performed rapidly and in parallel, e.g., on the order of tens of billions of bases per day from one sequencing machine, which is a scale of several times that of the human genome (approximately 3 billion bases in length).

For most applications, a complete genetic sequence of an organism is not determined de novo. Rather, in most instances, for the organism in question, a "reference" genome sequence has already been determined and is known. Short reads are typically derived from randomly fragmenting many copies of an individual sample genome of such an organism. Typically the first step for data analysis is the ordering of all of these fragments to determine the overall sequence of the individual sample using the reference genome sequence effectively as a template, i.e., mapping these short read fragments to the reference genome sequence. In this analysis, a determination is made concerning one or more likely locations in the reference genome to which each short read potentially maps, and is referred to as the short read mapping problem.

This short read mapping problem is technically challenging, both due to the volume of data and because sample sequences are generally not identical to the reference genome sequence, but as expected, will contain genetic variations. Due to the sheer volume of data, e.g., a billion short reads from a single organism (or a single sample), the speed or runtime of the data analysis is significant, with the data analysis now becoming the effective bottleneck in many bioinformatics pipelines. In addition, successful sequencing should exhibit sensitivity to genetic variations, i.e., should perform inexact searching, to successfully map sequences that are not completely identical to the reference, both because of technical errors in the sequencing and because of genetic differences between the sequenced organism and the reference genome.

Short read mapping has traditionally been performed by software tools running on a cluster of processors, such as:

1. Bowtie, Ben Langmead, Cole Trapnell, Mihai Pop, and Steven L. Salzberg, "Ultrafast and memory-efficient alignment of short DNA sequences to the human genome," *Genome Biology*, vol. 10, no. 3, p. R25, March 2009;
2. BWA, Heng Li and Richard Durbin, "Fast and accurate short read alingment with Burrows-Wheeler transform," *Bioinformatics*, vol. 25, no. 14, pp. 1754-1760, July 2009;
3. MAQ, Heng Li, Jue Ruan, and Richard Durbin, "Mapping short DNA sequencing reads and calling variants using mapping quality scores," *Genome Research*, vol. 18, no. 11, pp. 1851-1858, November 2008; and
4. BFAST, N. Homer, B. Merriman, and S. F. Nelson, "BFAST: An Alignment Tool for Large Scale Genome Resequencing," *PLoS ONE*, vol. 4, no. 11, p. e7767, November 2009.

As mentioned above, as the genetic sequencing of short reads has now become a highly automated and rapid process, providing sequencing in several (e.g., two) hours, these software analytical tools have now become the bottleneck in genetic sequencing analysis, which may require many hours to many days to generate the resulting aligned sequence (e.g., 7 to 56 hours for, respectively, Bowtie and BFAST).

Accordingly, a need remains for a system to provide for independent and parallel involvement of multiple configurable logic circuits, such as field programmable gate arrays ("FPGAs"), to rapidly accelerate such inexact searching, for genomic or other analyses. Such a system would benefit from a software and hardware co-design, where the hardware aspect relies upon FPGAs as an accelerator system. Such a system should also provide for greater accuracy than the prior art software-only solutions. In addition, such supercomputing applications would be served advantageously by parallel involvement of multiple FPGAs capable of operating independently and without extensive host involvement. Such a system should further provide for significantly parallel and rapid data transfers with minimal host involvement, including to and from memory located anywhere within the system.

SUMMARY OF THE INVENTION

The exemplary or representative embodiments of the present invention provide numerous advantages. Representative embodiments provide up to several orders of magnitude improvement over the prior art inexact searching, such as for genetic mapping. The representative systems further provide a considerably lower energy consumption. These improvements will therefore allow much more rapid inexact searching, with particular applications for genetic sequence analysis and application of such sequencing to entirely new areas of research.

A representative method for inexact search acceleration using reference data is disclosed, with a representative method embodiment comprising: using a field programmable gate array, selecting a query from a plurality of queries, each query comprising a sequence of a plurality of characters; using the field programmable gate array, selecting a first or next substring of the selected query, the first or next substring comprising a subsequence of characters of the selected query; using the field programmable gate array, reading a first or next section of an FM-index of the reference data from a memory circuit and calculating a plurality of suffix array intervals for the first or next substring with a corresponding plurality of prepended characters in a first or next position; using the field programmable gate array, reading a first or next character in the first or next position of the query and selecting a first or next suffix array interval of the plurality of suffix array intervals for the read first character; using the field programmable gate array, determining whether the first or next suffix array interval is valid and whether a beginning of the query has been reached; using the field programmable gate array, when the first or next suffix array interval is valid and the beginning of the query has been reached, returning a first search result; and using the field programmable gate array, when the first or next suffix array interval is not valid, returning a second search result that no match of the query with the reference data was found.

In a representative embodiment, the first search result is the valid first or next suffix array interval. In another representative embodiment, the first search result is an alignment of the query with the reference data. For example, the reference data is a reference genetic sequence and the first search result is an alignment location of a short read query with the reference genetic sequence.

A representative method embodiment may further comprise: using the field programmable gate array, when the first or next suffix array interval is valid and the beginning of the query has not been reached, reading a next section of an FM-index from the memory circuit and calculating a next plurality of suffix array intervals for a next sub string with a corresponding plurality of prepended characters in a next position; reading a next character in the next position of the query and selecting a next suffix array interval of the next plurality of suffix array intervals for the read next character; and determining whether the next suffix array interval is valid and whether a beginning of the query has been reached.

A representative method embodiment also may further comprise: using the field programmable gate array, when the first or next suffix array interval is not valid, modifying the query with up to a predetermined number of a plurality of character mismatches; or using a host computing system, when the first or next suffix array interval is not valid, modifying the query with up to a predetermined number of a plurality of character mismatches. In a representative embodiment, the plurality of character mismatches comprise at least one character mismatch selected from the group consisting of: a character insertion, a character deletion, or a character substitution.

A representative method embodiment may further comprise, using the field programmable gate array, converting the valid first or next suffix array interval to an alignment of the query with the reference data. The determination of whether the first or next suffix array interval is valid may further comprise, using the field programmable gate array, determining whether a difference between an upper bound "l" of the first or next suffix array interval and a lower bound "k" of the first or next suffix array interval is greater than or equal to one (1). In a representative embodiment, the determination of the upper and lower bounds further comprises: using the field programmable gate array, computing k=C(a)+O(a, k−1)+1 and computing l=C(a)+O(a, l); wherein C(a) is a count array having a number of characters in the reference data string which are lexicographically smaller than "a" and wherein O(a,i) is an occurrence array having a count of a number of occurrences of "a" in the first "i" characters of a Burrows-Wheeler Transform string of the FM-index.

A representative method embodiment may further comprise: using a host computing system, performing an initial search using the query and generating a plurality of partial query matches with the reference data.

A representative method embodiment may further comprise: using a host computing system, generating the FM-index by creating a suffix array and a Burrows-Wheeler Transform string. A representative method may further comprise: generating a count array having a number of characters in the reference data string which are lexicographically smaller than "a"; and generating an occurrence array having a count of a number of occurrences of "a" in the first "i" characters of the Burrows-Wheeler Transform string of the FM-index.

In a representative embodiment, the selecting, reading, calculating, determining and returning steps, are performed in parallel using a plurality of field programmable gate arrays.

A representative embodiment may also comprise partitioning the plurality of queries for parallel searching using a plurality of field programmable gate arrays A representative system for inexact search acceleration using reference data is also disclosed, with a representative system embodiment comprising: one or more memory circuits storing a plurality of queries and a FM-index of the reference data, each query comprising a sequence of a plurality of characters; and one or more field programmable gate arrays coupled to the one or more memory circuits, the one or more field programmable gate arrays configured to select a query from the plurality of queries; select a first or next substring of the selected query, the first or next substring comprising a subsequence of characters of the selected query; read a first or next section of the FM-index from the one or more memory circuits and calculate a plurality of suffix array intervals for the first or next sub string with a corresponding plurality of prepended characters in a first or next position; read a first or next character in the first or next position of the query and select a first or next suffix array interval of the plurality of suffix array intervals for the read first character; determine whether the first or next suffix array interval is valid and whether a beginning of the query has been reached; returning a first search result when the first or next suffix array interval is valid and the beginning of the query has been reached,; and returning a second search result that no match of the query with the reference data was found when the first or next suffix array interval is not valid.

In a representative embodiment, the one or more field programmable gate arrays may be further configured, when the first or next suffix array interval is valid and the beginning of the query has not been reached, to read a next section of the FM-index from the one or more memory circuits and calculate a next plurality of suffix array intervals for a next sub string with a corresponding plurality of prepended characters in a next position; read a next character in the next position of the query and select a next suffix array interval of the next plurality of suffix array intervals for the read next character; and determine whether the next suffix array interval is valid and whether a beginning of the query has been reached.

In a representative embodiment, the one or more field programmable gate arrays may be further configured, when the first or next suffix array interval is not valid, to modify the query with up to a predetermined number of a plurality of character mismatches.

A representative system embodiment may further comprise: a host computing system to modify the query with up to a predetermined number of a plurality of character mismatches when the first or next suffix array interval is not valid.

In a representative embodiment, the one or more field programmable gate arrays may be further configured to convert the valid first or next suffix array interval to an alignment of the query with the reference data.

In a representative embodiment, the one or more field programmable gate arrays may be further configured to determine whether a difference between an upper bound "l" of the first or next suffix array interval and a lower bound "k" of the first or next suffix array interval is greater than or equal to one (1) to determine whether the first or next suffix array interval is valid. The one or more field programmable gate arrays may be further configured to compute k=C(a)+O(a, k−1)+1 and compute l=C(a)+O(a, l); wherein C(a) is a count array having a number of characters in the reference data string which are lexicographically smaller than "a" and wherein O(a,i) is an occurrence array having a count of a number of occurrences of "a" in the first "i" characters of a Burrows-Wheeler Transform string of the FM-index.

A representative system embodiment may further comprise: a host computing system to perform an initial search using the query and generating a plurality of partial query matches with the reference data. A representative system embodiment also may further comprise: a host computing system to generate the FM-index by creating a suffix array and a Burrows-Wheeler Transform string.

For example, the host computing system may further generate a count array having a number of characters in the reference data string which are lexicographically smaller than "a"; and generating an occurrence array having a count of a number of occurrences of "a" in the first "i" characters of a Burrows-Wheeler Transform string of the FM-index. The one or more field programmable gate arrays also may be further configured to select, read, calculate, determine and return search results in parallel using a plurality of partitions of the plurality of queries for parallel searching.

In another representative embodiment, a method for inexact search acceleration using reference data comprises: using a field programmable gate array, selecting a query from a plurality of queries, each query comprising a sequence of a plurality of characters; using the field programmable gate array, selecting a first or next substring of the selected query, the first or next substring comprising a subsequence of characters of the selected query; using the field programmable gate array, reading a first or next section of an FM-index of the reference data from a memory circuit and calculating a plurality of suffix array intervals for the first or next sub string with a corresponding plurality of prepended characters in a first or next position; using the field programmable gate array, reading a first or next character in the first or next position of the query and selecting a first or next suffix array interval of the plurality of suffix array intervals for the read first character; using the field programmable gate array, determining whether the first or next suffix array interval is valid and whether a beginning of the query has been reached; using the field programmable gate array, when the first or next suffix array interval is valid and the beginning of the query has not been reached, reading a next section of the FM-index from the memory circuit and calculating a next plurality of suffix array intervals for a next sub string with a corresponding plurality of prepended characters in a next position; reading a next character in the next position of the query and selecting a next suffix array interval of the next plurality of suffix array intervals for the read next character; and determining whether the next suffix array interval is valid and whether a beginning of the query has been reached; using the field programmable gate array, when the first or next suffix array interval is valid and the beginning of the query has been reached, returning a first search result with an alignment of the query with the reference data; and using the field programmable gate array, when the first or next suffix array interval is not valid, returning a second search result with no alignment of the query with the reference data.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 8, divided into

FIG. 9, divided into FIG. 9A, FIG. 9B, and 9C, are diagrams illustrating exemplary or representative count and occurrence arrays, a BWT string, and a suffix array, which were constructed from the representative sorted BWT matrix of FIG. 8B.

FIG. 11, divided into FIG. 11A and FIG. 11B, are diagrams illustrating exemplary or representative SA intervals for a query search in a sorted BWT matrix.

FIG. 12 is a block diagram illustrating an exemplary or representative parallel configuration for a system, with a plurality of input query partitions.

DETAILED DESCRIPTION OF REPRESENTATIVE EMBODIMENTS

Figure 1:
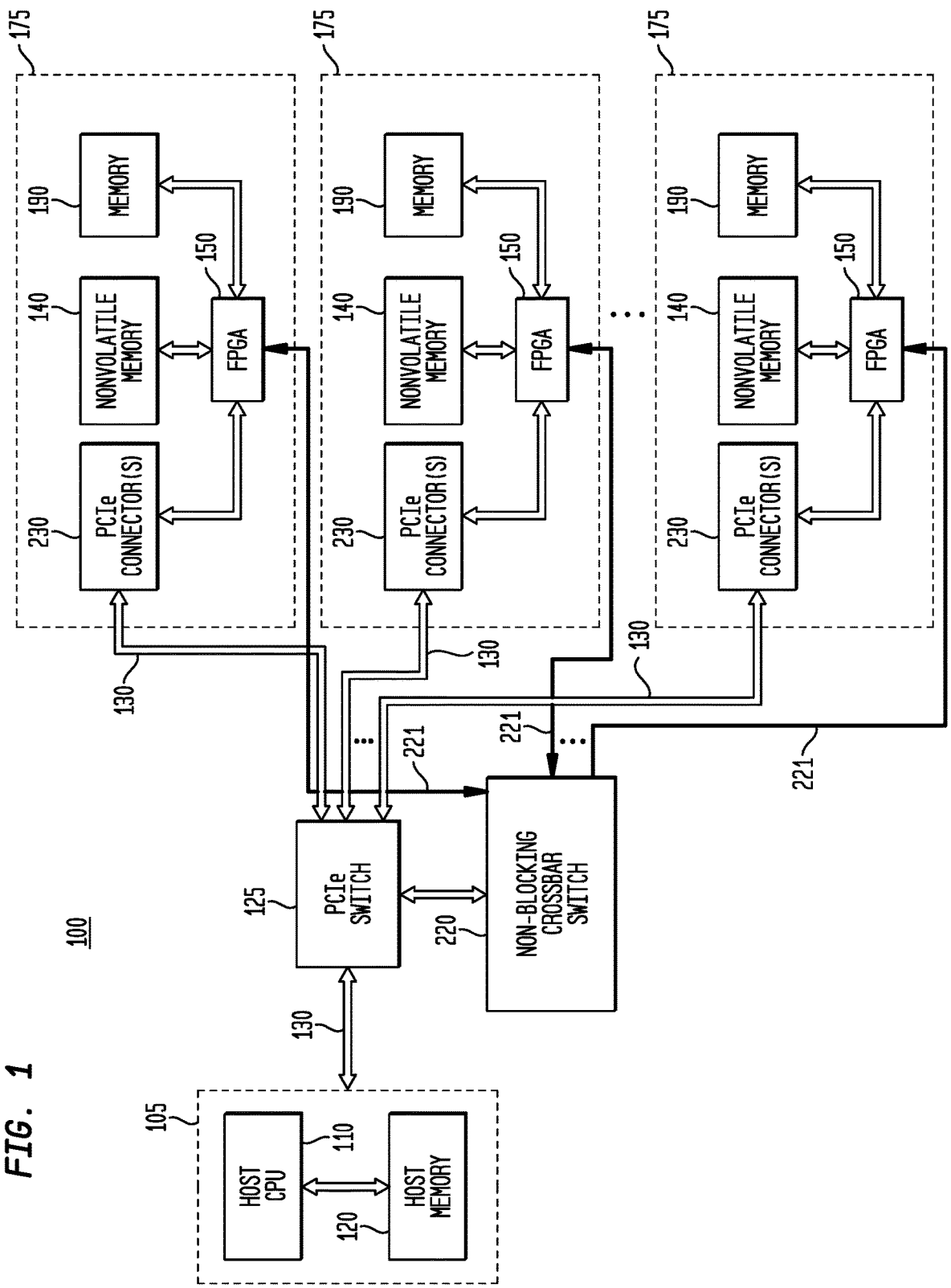
FIG. 1 is a block diagram illustrating an exemplary or representative first system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
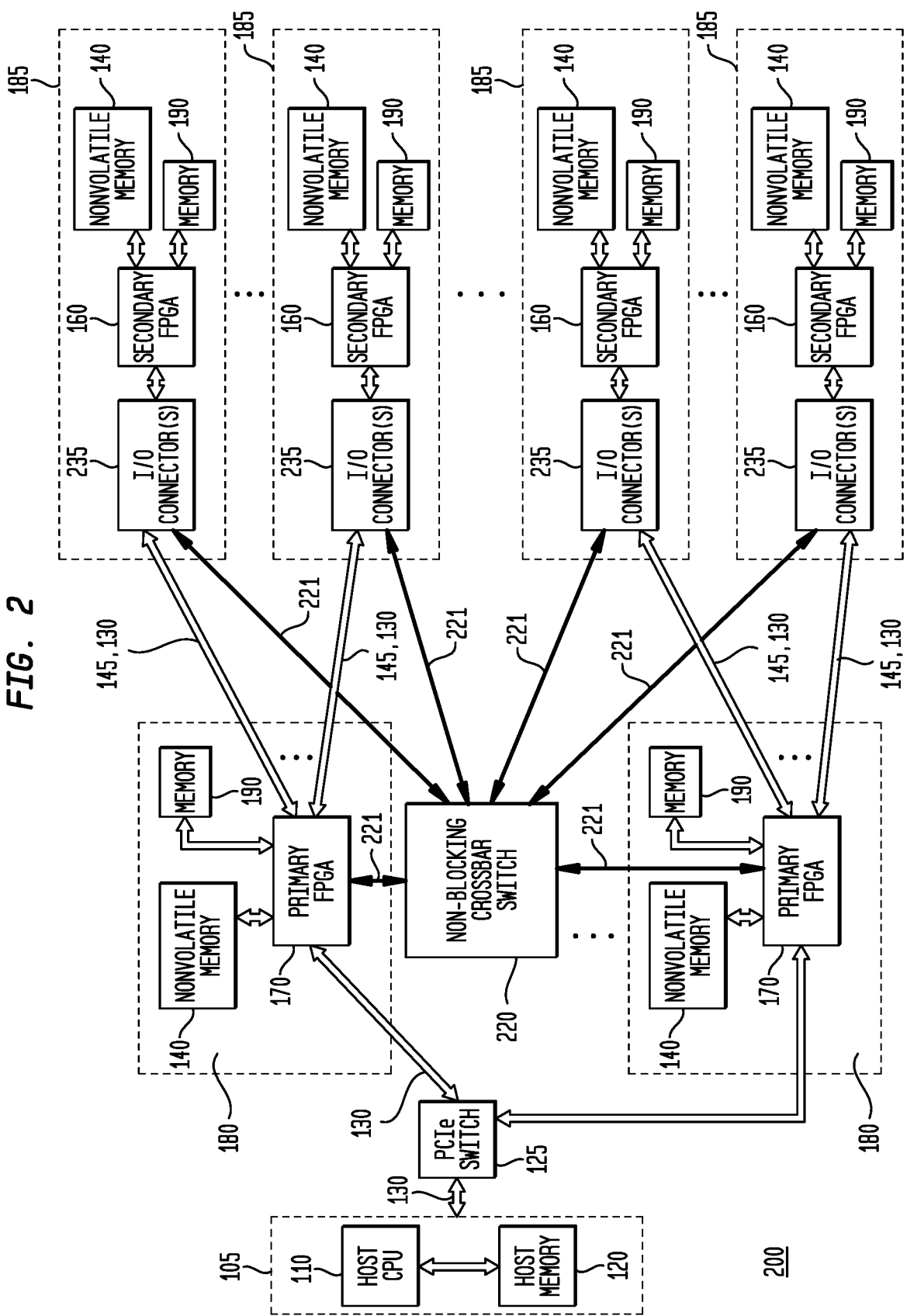
FIG. 2 is a block diagram illustrating an exemplary or representative second system embodiment.
Figure 3:
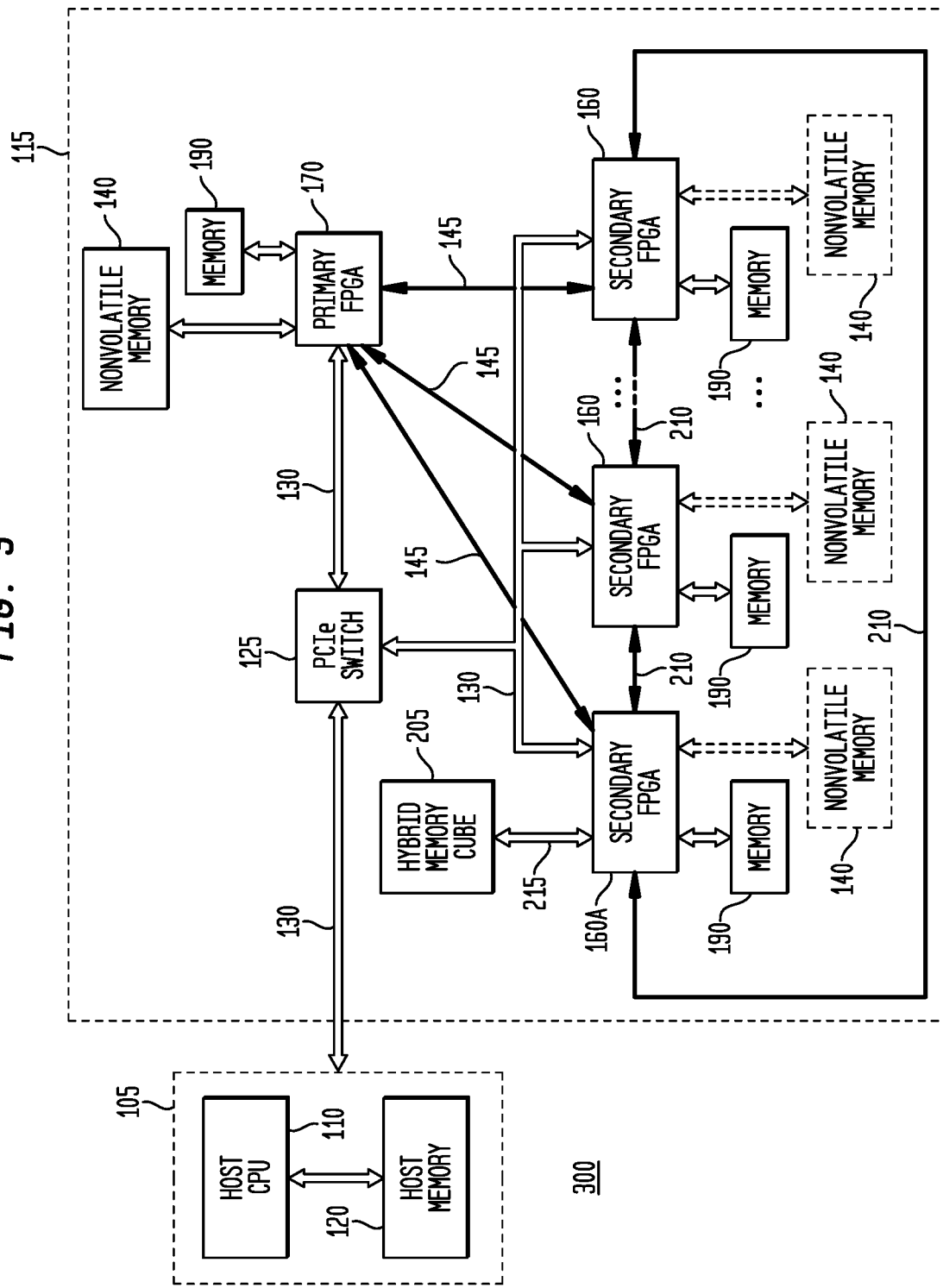
FIG. 3 is a block diagram illustrating an exemplary or representative third system embodiment.
Figure 4:
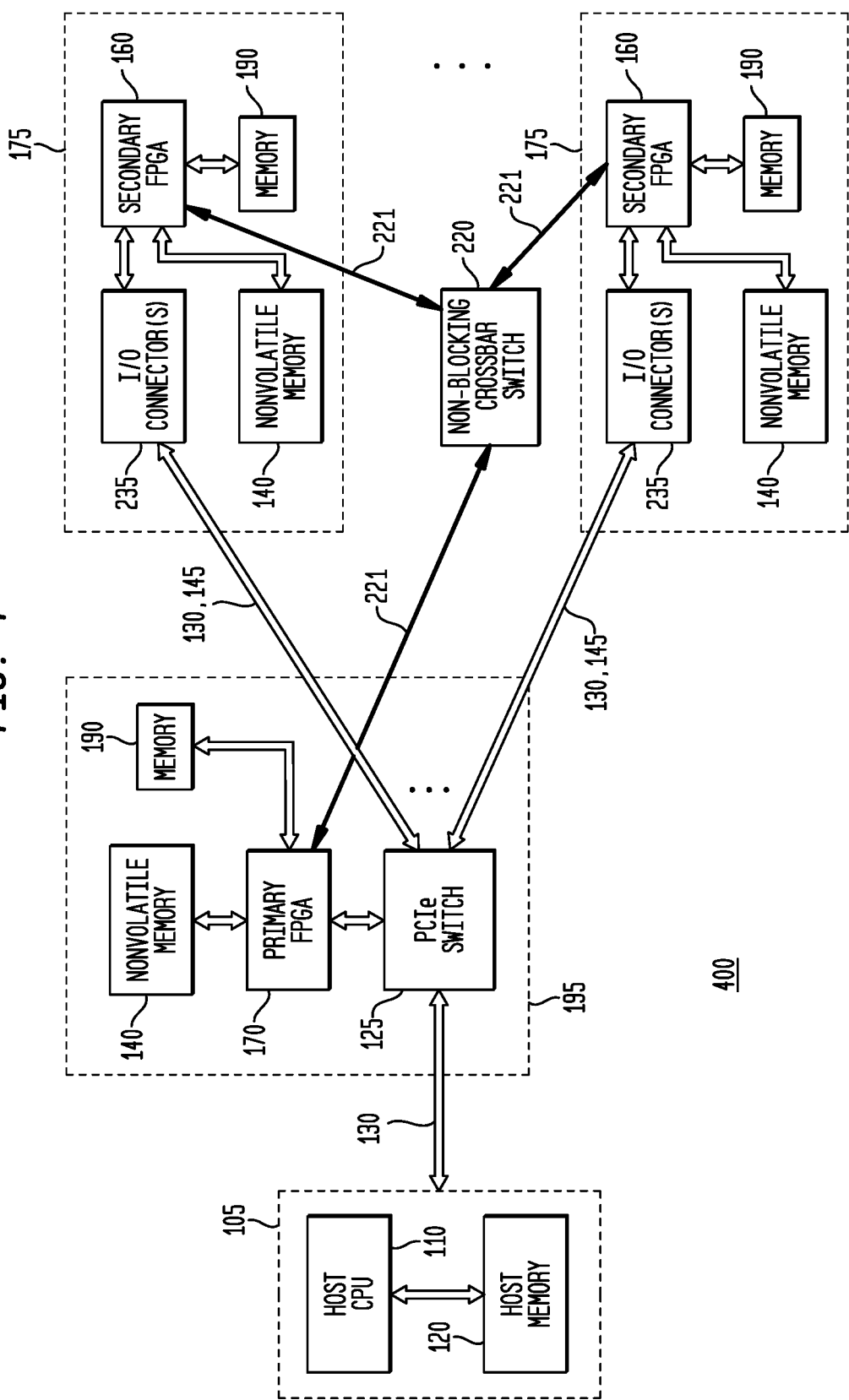
FIG. 4 is a block diagram illustrating an exemplary or representative fourth system embodiment.

FIG. 1 is a block diagram illustrating an exemplary or representative first system 100 embodiment. FIG. 2 is a block diagram illustrating an exemplary or representative second system 200 embodiment. FIG. 3 is a block diagram illustrating an exemplary or representative third system 300 embodiment and first apparatus embodiment. FIG. 4 is a block diagram illustrating an exemplary or representative fourth system 400 embodiment.

As illustrated in FIGS. 1-4 and 18, the systems 100, 200, 300, 400, 800 include one or more host computing systems 105, such as a computer or workstation, having one or more central processing units (CPUs) 110, which may be any type of processor, and host memory 120, which may be any type of memory, such as a hard drive or a solid state drive, and which may be located with or separate from the host CPU 110, all for example and without limitation, and as discussed in greater detail below. The memory 120 typically stores data to be utilized in or was generated by a selected application and also generally a configuration bit file or image for a selected application. Not separately illustrated, any of the host computing systems 105 may include a plurality of different types of processors, such as graphics processors, multi-core processors, etc., also as discussed in greater detail below. The various systems 100, 200, 300, 400, 800 differ from one another in terms of the arrangements of circuit components, types of components, and types of communication between and among the various components, as described in greater detail below.

The one or more host computing systems 105 are typically coupled through one or more communication channels or lines, illustrated as PCI express (Peripheral Component Interconnect Express or "PCIe") lines 130, either directly or through a PCIe switch 125, to one or more configurable logic elements such as one or more FPGAs 150 (such as a Spartan 6 FPGA or a Kintex-7 FPGA, both available from Xilinx, Inc. of San Jose, Calif., US, or a Stratix 10 or Cyclone V FPGA available from Altera Corp. of San Jose, Calif., US, for example and without limitation), each of which in turn is coupled to a nonvolatile memory 140, such as a FLASH memory (such as for storing configuration bit images), and to a plurality of random access memories 190, such as a plurality of DDR3 (SODIMM) memory integrated circuits. In a first embodiment as illustrated, each FPGA 150 and corresponding memories 140, 190 directly coupled to that FPGA 150 are collocated on a corresponding computing module (or circuit board) 175 as a module or board in a rack mounted system having many such computing modules 175, such as those available from Pico Computing of Seattle, Wash. US. As illustrated, each computing module 175 includes as an option a PCIe input and output (I/O) connector(s) 230 to provide the PCIe 130 connections, such as for a rack mounted system. In representative embodiments, the I/O connector(s) 230 may also include additional coupling functionality, such as JTAG coupling, input power, ground, etc., for example and without limitation. The PCIe switch 125 may be located or positioned anywhere in a system 100, 200, 300, 400, 800, such as on a separate computing module (such as a backplane circuit board, which can be implemented with computing module 195, for example), or on any of the computing modules 175, 180, 185, 195, 115 for example and without limitation. In addition, other types of communication lines or channels may be utilized to couple the one or more host computing systems 105 to the FPGAs 150, such as an Ethernet line, which in turn may be coupled to other intervening rack-mounted components to provide communication to and from one or more FPGAs 150 (160, 170) and other modules. Also in addition, the various FPGAs 150 (160, 170) may have additional or alternative types of communication with the PCIe switch 125, such as via general purpose (GP) I/O lines (not separately illustrated).

In addition to communication over PCIe communication lines 130 via PCIe switch 125 (e.g., available from PLX Technology, Inc. of Sunnyvale, Calif., US), another significant feature of the systems 100, 200, 300, 400, 800 is the optional use of one or more non-blocking crossbar switches 220. The non-blocking crossbar switch 220 provides for pairwise and concurrent communication (lines 221) between and among the FPGAs 150, 160, 170, without communication between any given pair of FPGAs 150, 160, 170 blocking any other communication between another pair of FPGAs 150, 160, 170. In exemplary embodiment, one or more non-blocking crossbar switches 220 are provided to have sufficient capacity to enable direct FPGA to FPGA communication between and among all of the FPGAs 150, 160, 170 in a selected portion of the system 100, 200. In a representative embodiment, one or more non-blocking crossbar switches 220 are implemented using one or more FPGAs 150, 160, 170 which have been configured accordingly. In another exemplary embodiment not separately illustrated, one or more non-blocking crossbar switches 220 are provided internally within one or more FPGAs 150, 160, 170 for concurrent accesses to a plurality of memories 190.

Referring to FIG. 2, the system 200 differs insofar as the various FPGAs to are hierarchically organized into one or more primary (or central) configurable logic elements such as primary FPGAs 170 (also such as a Spartan 6 FPGA or any of the other FPGAs mentioned above, for example and without limitation) and a plurality of secondary (or remote) configurable logic elements such as one or more secondary FPGAs 160. The one or more host computing systems 105 are typically coupled through one or more communication channels or lines, illustrated as PCI express (Peripheral Component Interconnect Express or "PCIe") lines 130, either directly or through a PCIe switch 125, to primary FPGAs 170, each of which in turn is coupled to a plurality of secondary FPGAs 160, also through one or more corresponding communication channels, illustrated as a plurality of JTAG lines 145 (Joint Test Action Group ("JTAG") is the common name for the IEEE 1149.1 Standard Test Access Port and Boundary-Scan Architecture). In this embodiment, (illustrated in FIG. 2), each of the secondary FPGAs 160 is provided on a separate computing module 185 which is couplable to the computing module 180 having the primary FPGA 170. In various embodiments, the PCIe lines 130 and JTAG lines 145 are illustrated as part of a larger bus, and typically routed to different pins on the various FPGAs 150, 160, 170.

The PCIe switch 125 may be positioned anywhere in a system 100, 200, 300, 400, 800, such as on a separate computing module, for example and without limitation, or on one or more of the computing modules 180 having the primary FPGA 170, as illustrated in FIG. 4 for computing module 195, which can be utilized to implement a backplane for multiple modules 175, as illustrated. In an exemplary embodiment, due to a significantly large fan out of the PCIe lines 130 to other modules and cards in the various systems 100, 200, 300, 400, 800, the PCIe switch 125 is typically located on the backplane of a rack-mounted system (available from Pico Computing, Inc. of Seattle, Wash. US). A PCIe switch 125 may also be collocated on various computing modules (e.g., 195), to which many other modules (e.g., 175) connect (e.g., through PCIe connector(s) 230 or, more generally, I/O connectors 235 which include PCIe, JTAG, GPIO, power, ground, and other signaling lines). In addition, other types of communication lines or channels may be utilized to couple the one or more host computing systems 105 to the primary FPGAs 170 and or secondary FPGAs 160, such as an Ethernet line, which in turn may be coupled to other intervening rack-mounted components to provide communication to and from one or more primary FPGAs 170 and other modules.

In this system 200 embodiment, the primary and secondary FPGAs 170 and 160 are located on separate computing modules 180 and 185, also in a rack mounted system having many such computing modules 180 and 185, also such as those available from Pico Computing of Seattle, Wash. US. The computing modules 180 and 185 may be coupled to each other via any type of communication lines, including PCIe and/or JTAG. For example, in an exemplary embodiment, each of the secondary FPGAs 160 is located on a modular computing module (or circuit board) 185 which have corresponding I/O connectors 235 to plug into a region or slot of the primary FPGA 170 computing module 180, up to the capacity of the primary FPGA 170 computing module 180, such as one to six modular computing modules 185 having secondary FPGAs 160. In representative embodiments, the I/O connector(s) 235 may include a wide variety of coupling functionality, such as JTAG coupling, PCIe coupling, input power, ground, etc., for example and without limitation. For purposes of the present disclosure, systems 100, 200, 300, 400, 800 function similarly, and any and all of these system configurations are within the scope of the disclosure.

Not separately illustrated in FIGS. 1-4, each of the various computing modules 175, 180, 185, 195, 115 typically include many additional components, such as power supplies, additional memory, additional input and output circuits and connectors, switching components, etc.

The various systems 100, 200, 300, 400, 800 may also be combined into a plurality of system configurations, such as mixing the different types of FPGAs 150, 160, 170 and computing modules 175, 180, 185, 195, 115 into the same system, including within the same rack-mounted system.

Additional representative system 300, 400 configurations or arrangements are illustrated in FIGS. 3 and 4. In the system 300 embodiment, the primary and secondary FPGAs 150 and 160, along with PCIe switch 125, are all collocated on a dedicated computing module 115 as a large module in a rack mounted system having many such computing modules 115, such as those available from Pico Computing of Seattle, Wash. US. In the system 400 embodiment, (illustrated in FIG. 4), each of the secondary FPGAs 160 is provided on a separate computing module 175 which is couplable to the computing module 195 having the primary FPGA 170. PCIe switches 125 are also illustrated as collocated on computing module 195 for communication with secondary FPGAs 160 over PCIe communication lines 130, although this is not required and such a PCIe switch 125 may be positioned elsewhere in a system 100, 200, 300, 400, 800, such as on a separate computing module, for example and without limitation.

The representative system 300 illustrates some additional features which may be included as options in a computing module, and is further illustrated as an example computing module 115 which does not include the optional nonblocking crossbar switch 220. As illustrated in FIG. 3, the various secondary FPGAs 160 also have direct communication to each other, with each FPGA 160 coupled through communication lines 210 to its neighboring FPGAs 160, such as serially or "daisy-chained" to each other. Also, one of the FPGAs 160, illustrated as FPGA 160A, has been coupled through high speed serial lines 215, to a hybrid memory cube ("HMC") 205, which incorporates multiple layers of memory and at least one logic layer, with very high memory density capability. For this system 300, the FPGA 160A has been configured as a memory controller (and potentially a switch or router), providing access and communication to and from the HMC 205 for any of the various FPGAs 160, 170.

Figure 20:
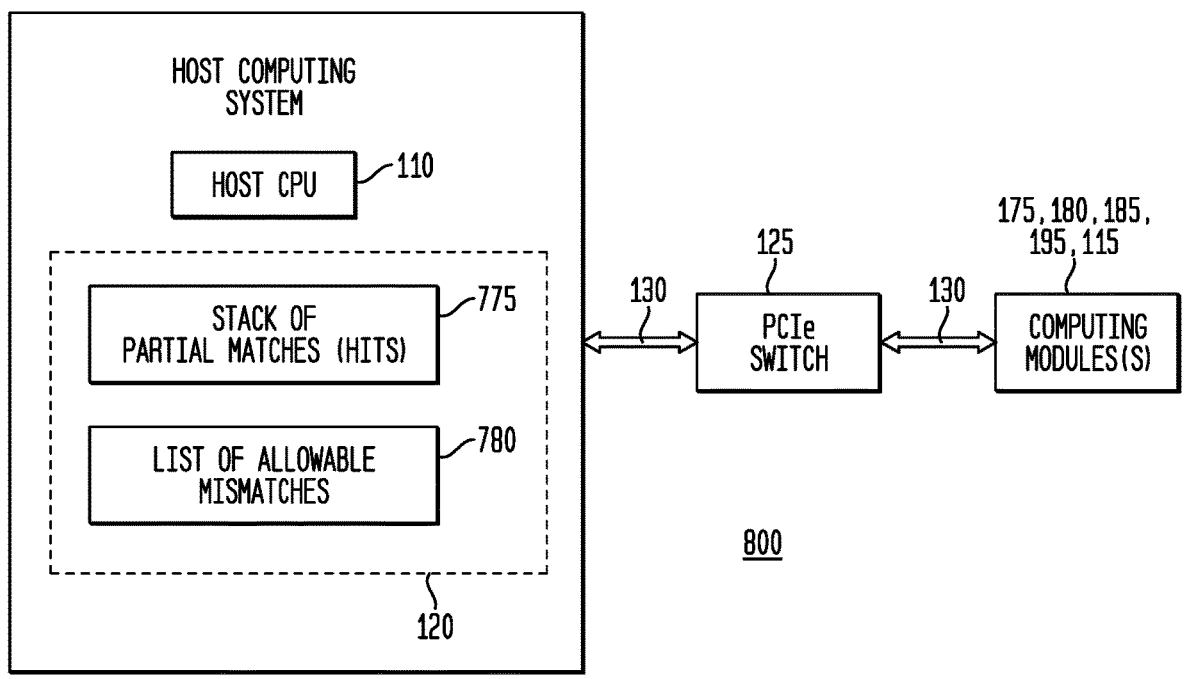
FIG. 20 is a block diagram illustrating an exemplary or representative fifth system embodiment

Another heterogeneous system 800 is illustrated and described below with reference to FIG. 20, with particular application for inexact searching, and the search process divided between the host computing system 105 and the computing modules 175, 180, 185, 195, 115.

As a consequence, for purposes of the present disclosure, a system 100, 200, 300, 400, 800 comprises one or more host computing systems 105, couplable through one or more communication lines (such as PCIe communication lines (130), directly or through a PCIe switch 125), to one or more FPGAs 150 and/or primary FPGAs 170. In turn, each primary FPGA 170 is coupled through one or more communication lines, such as JTAG lines 145 or PCIe communication lines 130, to one or more secondary FPGAs 160. Depending upon the selected embodiment, each FPGA 150, 160, 170 is optionally coupled to a non-blocking crossbar switch 220 for pairwise communication with any other FPGA 150, 160, 170. In addition, each FPGA 150, 160, 170 is typically coupled to one or more nonvolatile memories 140 and one or more random access memories 190, which may be any type of random access memory.

Significant features are enabled in the system 100, 200, 300, 400, 800 as an option, namely, the highly limited involvement of the host CPU 110 in configuring any and all of the FPGAs 150, 160, 170, which frees the host computing system 105 to be engaged in other tasks. In addition, the configuration of the FPGAs 150, 160, 170 may be performed in a massively parallel process, allowing significant time savings. Moreover, because the full configurations of the FPGAs 150, 160, 170 are not required to be stored in nonvolatile memory 140 (such as FLASH), with corresponding read/write cycles which are comparatively slow, configuration of the FPGAs 150, 160, 170 may proceed at a significantly more rapid rate, including providing new or updated configurations. The various FPGAs 150, 160, 170 may also be configured as known in the art, such as by loading a complete configuration from nonvolatile memory 140.

Another significant feature of the systems 100, 200, 300, 400, 800 is that only basic (or base) resources for the FPGAs 150 or primary FPGAs 170 are stored in the nonvolatile memory 140 (coupled to a FPGA 150 or a primary FPGA 170), such as a configuration for communication over the PCIe lines 130 (and possibly JTAG lines 145, such as for secondary FPGAs 160), and potentially also a configuration for one or more DMA engines (depending upon the selected FPGA, the FPGA may be available with incorporated DMA engines). As a result, upon system 100, 200, 300, 400, 800 startup, the only configurations required to be loaded into the FPGA 150 or primary FPGA 170 is limited or minimal, namely, communication (e.g., PCIe and possibly JTAG) functionality and or DMA functionality. In a representative embodiment, upon system 100, 200, 300, 400, 800 startup, the only configuration required to be loaded into the FPGA 150 or a primary FPGA 170 is a communication configuration for PCIe functionality. As a consequence, this base PCIe configuration may be loaded quite rapidly from the nonvolatile memory 140. Stated another way, except for loading of the base communication configuration for PCIe functionality, use of the nonvolatile memory 140 for FPGA configuration is bypassed entirely, both for loading of an initial configuration or an updated configuration.

Instead of a host CPU 110 "bit banging" or transferring a very large configuration bit image to each FPGA 150 or primary FPGA 170, configuration of the system 100, 200, 300, 400, 800 occurs rapidly and in parallel when implemented in representative embodiments. Configuration of the FPGAs 150 or primary FPGAs 170 and secondary FPGAs 160 begins with the host CPU 110 merely transmitting a message or command to one or more FPGAs 150 or primary FPGAs 170 with a memory address or location in the host memory 120 (and typically also a file size) of the configuration bit image (or file) which has been stored in the host memory 120, i.e., the host CPU 110 sets the DMA registers of the FPGA 150 or primary FPGA 170 with the memory address and file size for the selected configuration bit image (or file) in the host memory 120. Such a "load FPGA" command is repeated for each of the FPGAs 150 or primary FPGAs 170 (and possibly each secondary FPGA 160, depending upon the selected embodiment), i.e., continuing until the host CPU 110 does not find any more FPGAs 150 or primary FPGAs 170 (and/or secondary FPGAs 160) in the system 100, 200, 300, 400, 800 and an error message may be returned. Typically, the host CPU 110 transmits one such message or command to each FPGA 150 or primary FPGA 170 that will be handling a thread of a parallel, multi-threaded computation. In the representative embodiments, the host CPU 110 is then literally done with the configuration process, and is typically notified with an interrupt signal from a FPGA 150 or primary FPGA 170 once configuration is complete. Stated another way, from the perspective of the host computing system 105, following transmission of generally a single message or command having a designation of a memory address (and possibly a file size), the configuration process is complete. This is a huge advance over prior art methods of FPGA configuration in supercomputing systems.

Using a DMA engine, along with communication lines such PCIe lines 130 which support communication of large bit streams, each FPGA 150 or primary FPGA 170 then accesses the host memory 120 and obtains the configuration bit image (or file) (which configuration also generally is loaded into the FPGA 150 or primary FPGA 170). By using the DMA engine, much larger files may be transferred quite rapidly, particularly compared to any packet- or word-based transmission (which would otherwise have to be assembled by the host CPU 110, a comparatively slow and labor-intensive task). This is generally performed in parallel (or serially, depending upon the capability of the host memory 120) for all of the FPGAs 150 or primary FPGAs 170. In turn, each primary FPGA 170 then transmits (typically over JTAG lines 145 or PCIe communication lines 130) the configuration bit image (or file) to each of the secondary FPGAs 160, also typically in parallel. Alternatively, each primary FPGA 150 may re-transmit (typically over JTAG lines 145 or PCIe communication lines 130) the information of the load FPGA message or command to each of the secondary FPGAs 160, namely the memory address in the host memory 120 and the file size, and each secondary FPGA 160 may read or otherwise obtain the configuration bit image, also using DMA engines, for example and without limitation. As another alternative, the host computing system 105 may transmit the load FPGA message or command to each of the FPGAs 150 or primary FPGAs 170 and secondary FPGAs 160, which then obtain the configuration bit image, also using DMA engines as described above. All such variations are within the scope of the disclosure.

By using communication lines such as PCIe lines 130 and JTAG lines 145 with the design of the system 100, 200, 300, 400, 800, the configuration bit image is loaded quite rapidly into not only into each of the FPGAs 150 and primary FPGAs 170 but also into each of the secondary FPGAs 160. This allows not only for an entire computing module 175 (or computing modules 180, 185, 195) to be reloaded in seconds, rather than hours, but the entire system 100, 200, 300, 400, 800 may be configured and reconfigured in seconds, also rather than hours. As a result, read and write operations to local memory (e.g., nonvolatile memory 140) largely may be bypassed almost completely in the configuration process, resulting in a huge time savings. In selected embodiments, if desired but certainly not required, the configuration bit image (or file) may also be stored locally, such as in nonvolatile memory 140 (and/or nonvolatile memory 190 (e.g., FLASH) associated with computing modules 175, 180, 185, 195, 115).

As a result of this ultrafast loading of configurations, another significant advantage of the system 100, 200, 300, 400, 800 is the corresponding capability, using the same process, for ultrafast reconfiguration of the entire system 100, 200, 300, 400, 800. This is particularly helpful for the design, testing and optimization of system 100, 200, 300, 400, 800 configurations for any given application, including various computationally intensive applications such as bioinformatics applications (e.g., gene sequencing).

Figure 5:
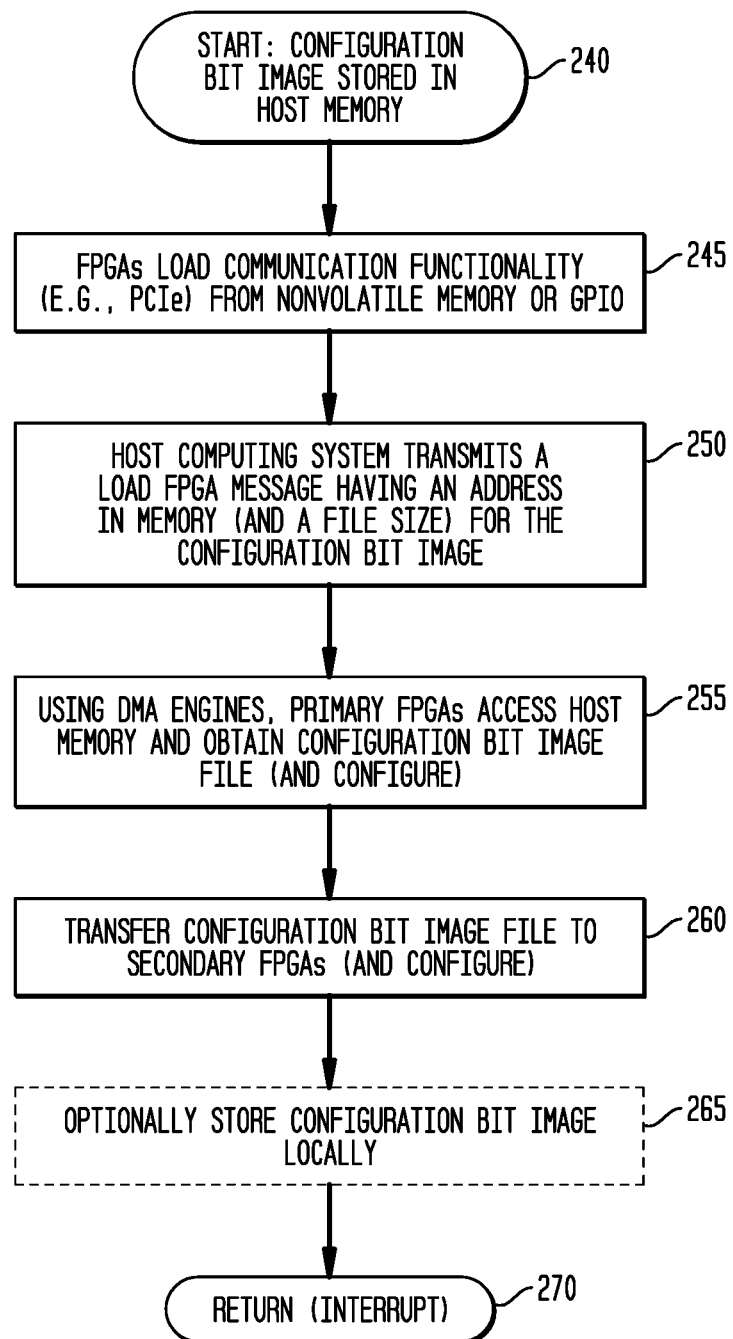
FIG. 5 is a flow diagram illustrating an exemplary or representative configuration method embodiment.

FIG. 5 is a flow diagram illustrating an exemplary or representative method embodiment for system configuration and reconfiguration, and provides a useful summary of this process. Beginning with start step 240 and one or more FPGA 150, 160, 170 configurations (as configuration bit images) having been stored in a host memory 120, the system 100, 200, 300, 400, 800 powers on or otherwise starts up, and the FPGAs 150, 160, 170 load the base communication functionality such as a PCIe configuration image (and possibly DMA functionality) from nonvolatile memory 140, step 245. Step 245 is optional, as such communication functionality also can be provided to FPGAs 150, 160, 170 via GPIO (or GP I/O) lines (general purpose input and output lines, not separately illustrated), for example and without limitation. The host CPU 110 (or more generally, host computing system 105) then generates and transmits a "load FPGA" command or message to one or more FPGAs 150 or primary FPGAs 170 (and/or secondary FPGAs 160), step 250, in which the load FPGA command or message includes a starting memory address (in host memory 120) and a file size designation for the selected configuration bit image which is to be utilized. Using the DMA engines, and depending upon the selected variation (of any of the variations described above), the one or more FPGAs 150 or primary FPGAs 170 (and/or secondary FPGAs 160) obtain the configuration bit image from the host memory 120, step 255, and use it to configure. Also depending upon the selected embodiment, the one or more FPGAs 150 or primary FPGAs 170 may also transfer the configuration bit image to each of the secondary FPGAs 160, step 260, such as over JTAG lines 145 and bypassing nonvolatile memory 140, 190, which the secondary FPGAs 160 also use to configure. Also depending upon the selected embodiment, the configuration bit image may be stored locally, step 265, as a possible option as mentioned above. Having loaded the configuration bit image into the FPGAs 150, 160, 170, the method may end, return step 270, such as by generating an interrupt signal back to the host computing system 105.

The systems 100, 200, 300, 400, 800 enable one of the significant features of the present disclosure, namely, the highly limited involvement of the host CPU 110 in data transfers between the host computing system 105 and any of the FPGAs 150, 160, 170, and their associated memories 190, and additionally, the highly limited involvement of the host CPU 110 in data transfers between and among any of the FPGAs 150, 160, 170, and their associated memories 190, all of which frees the host computing system 105 to be engaged in other tasks, and further is a significant departure from prior art systems. Once data transfer directions or routes have been established for a given or selected application within the systems 100, 200, 300, 400, 800, moreover, these data communication paths are persistent for the duration of the application, continuing without any further involvement by the host computing system 105, which is also a sharp contrast with prior art systems.

Instead of a host CPU 110 "bit banging" or transferring a data file, including a very large data file, to each FPGA 150, 160, 170 or its associated memories 190, data transfers within the system 100, 200, 300, 400, 800 occur rapidly and in parallel, and following setup of the DMA registers in the various FPGAs 150, 160, 170, largely without involvement of the host computing system 105. The data transfer paths are established by the host CPU 110 merely transmitting a message or command to one or more FPGAs 150, 160, 170 to set the base DMA registers within the FPGA 150, 160, 170 with a memory 190 address (or address or location in the host memory 120, as the case may be), a file size of the data file, and a stream number., i.e., the host CPU 110 (or another FPGA 150, 160, 170 configured for this task) sets the DMA registers of the FPGA 150, 160, 170 with the memory address and file size for the selected data file in the host memory 120 or in one of the memories 190, and also assigns a stream number, including a tie (or tied) stream number if applicable. Once this is established, the system 100, 200, 300, 400, 800 is initialized for data transfer, and these assignments persist for the duration of the application, and do not need to be re-established for subsequent data transfers.

The host CPU 110 (or an FPGA 150, 160, 170 configured for this task) has therefore established the various data transfer paths between and among the host computing system 105 and the FPGAs 150, 160, 170 for the selected application. As data is then transferred throughout the system 100, 200, 300, 400, 800, header information for any data transfer includes not only a system address (e.g., PCIe address) for the FPGA 150, 160, 170 and/or its associated memories 190, but also includes the "stream" designations (or information) and "tie (or tied) stream" designations (or information), and is particularly useful for multi-threaded or other parallel computation tasks. The header (e.g., a PCIe data packet header) for any selected data transfer path includes: (1) bits for an FPGA 150, 160, 170 and/or memory 190 address and file size; (2) additional bits for an assignment a stream number to the data transfer (which stream number can be utilized repeatedly for additional data to be transferred subsequently for ongoing computations); and (3) additional bits for any "tie stream" designations, if any are utilized or needed. In addition, as each FPGA 150, 160, 170 may be coupled to a plurality of memories 190, each memory address typically also includes a designation of which memory 190 associated with the designated FPGA 150, 160, 170.

Figure 6:
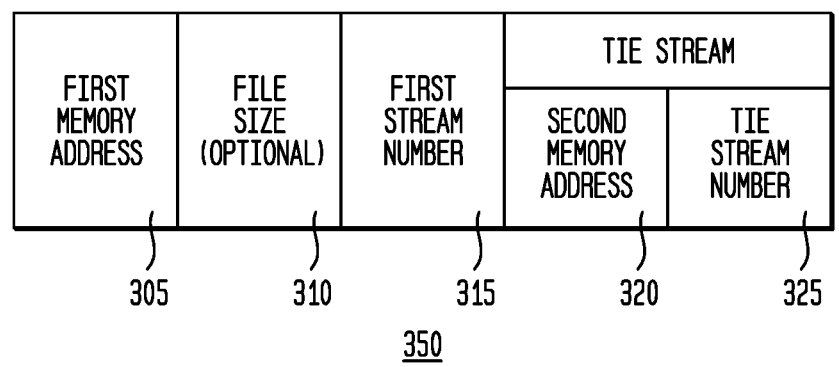
FIG. 6 is a block diagram illustrating exemplary or representative fields for a (stream) packet header.

FIG. 6 is a block diagram illustrating exemplary or representative fields for a (stream) packet header 350, comprising a plurality of bits designating a first memory address (field 305) (typically a memory 190 address), a plurality of bits designating a file size (field 310) (as an optional field), a plurality of bits designating a (first) stream number (field 315), and as may be necessary or desirable, two additional and optional tie stream fields, namely, a plurality of bits designating the (second) memory 190 address for the tied stream (field 320) and a plurality of bits designating a tie (or tied) stream number (field 325).

Any application may then merely write to the selected stream number or read from the selected stream number for the selected memory 190 address (or FPGA 150, 160, 170 address), without any involvement by the host computing system 105, for as long as the application is running on the system 100, 200. In addition, for data transfer throughout the systems 100, 200, data transfer in one stream may be tied to a data transfer of another stream, allowing two separate processes to occur without involvement of the host computing system 105. The first "tie stream" process allows the "daisy chaining" of data transfers, so a data transfer to a first stream number for a selected memory 190 (or FPGA 150, 160, 170 process) on a first computing module 175, 180, 185, 195, 115 may be tied or chained to a subsequent transfer of the same data to another, second stream number for a selected memory 190 (or FPGA 150, 160, 170 process) on a second computing module 175, 180, 185, 195, 115, e.g., data transferred from the host computing system 105 or from a first memory 190 on a first computing module 175, 180, 185, 195, 115 (e.g., card "A") (stream "1") to a second memory 190 on a second computing module 175, 180, 185, 195, 115 (e.g., card "B") will also be further transmitted from the second computing module 175, 180, 185, 195, 115 (e.g., card "B") as a stream "2" to a third memory 190 on a third computing module 175, 180, 185, 195, 115 (e.g., card "C"), thereby tying streams 1 and 2, not only for the current data transfer, but for the entire duration of the application (until changed by the host computing system 105).

The second "tie stream" process allows the chaining or sequencing of data transfers between and among any of the FPGAs 150, 160, 170 without any involvement of the host computing system 105 after the initial setup of the DMA registers in the FPGAs 150, 160, 170. As a result, a data result output from a first stream number for a selected memory 190 (or FPGA 150, 160, 170 process) on a first computing module 175, 180, 185, 195, 115 may be tied or chained to be input data for another, second stream number for a selected memory 190 (or FPGA 150, 160, 170 process) on a second computing module 175, 180, 185, 195, 115, e.g., stream "3" data transferred from the a first memory 190 on a first computing module 175, 180, 185, 195, 115 (e.g., card "A") will transferred as a stream "4" to a second memory 190 on a second computing module 175, 180, 185, 195, 115 (e.g., card "B"), thereby tying streams 3 and 4, not only for the current data transfer, but for the entire duration of the application (also until changed by the host computing system 105).

Any of these various data transfers may occur through any of the various communication channels of the systems 100, 200, 300, 400, 800, in addition to transmission over the PCIe network (PCIe switch 125 with PCIe communication lines 130), including through the non-blocking crossbar switch 220 (as an option) and over the JTAG lines 145, depending upon the selected system 100, 200, 300, 400, 800 configuration. All of these various mechanisms provide for several types of direct FPGA-to-FPGA communication, without any ongoing involvement by host computing system 105 once the DMA registers have been established. Stated another way, in the representative embodiments, the host CPU 110 is then literally done with the data transfer process, and from the perspective of the host computing system 105, following transmission of the DMA setup messages having a designation of a memory 190 address, a file size (as an option), and a stream number, the data transfer configuration process is complete. This is a huge advance over prior art methods of data transfer in supercomputing systems utilizing FPGAs.

Using a DMA engine, along with communication lines such PCIe lines 130 which support communication of large bit streams, each FPGA 150, 160, 170 then accesses the host memory 120 or a memory 190 and obtains the data file for a read operation, or performs a corresponding write operation, all using the established address and stream number. By using the DMA engine, much larger files may be transferred quite rapidly, particularly compared to any packet- or word-based transmission. This is generally performed in parallel (or serially, depending upon the application) for all of the FPGAs 150, 160, 170.

By using communication lines such as PCIe lines 130 and JTAG lines 145 with the design of the system 100, 200, 300, 400, 800, data transfer occurs quite rapidly, not only into each of the FPGAs 150 or primary FPGAs 170 but also into each of the secondary FPGAs 160, and their associated memories 190. As a result, resources, including memory 190, may be shared across the entire system 100, 200, 300, 400, 800, with any FPGA 150, 160, 170 being able to access any resource anywhere in the system 100, 200, 300, 400, 800, include any of the memories 190 on any of the computing modules or cards (modules) 175, 180, 185, 195, 115.

Figure 7:
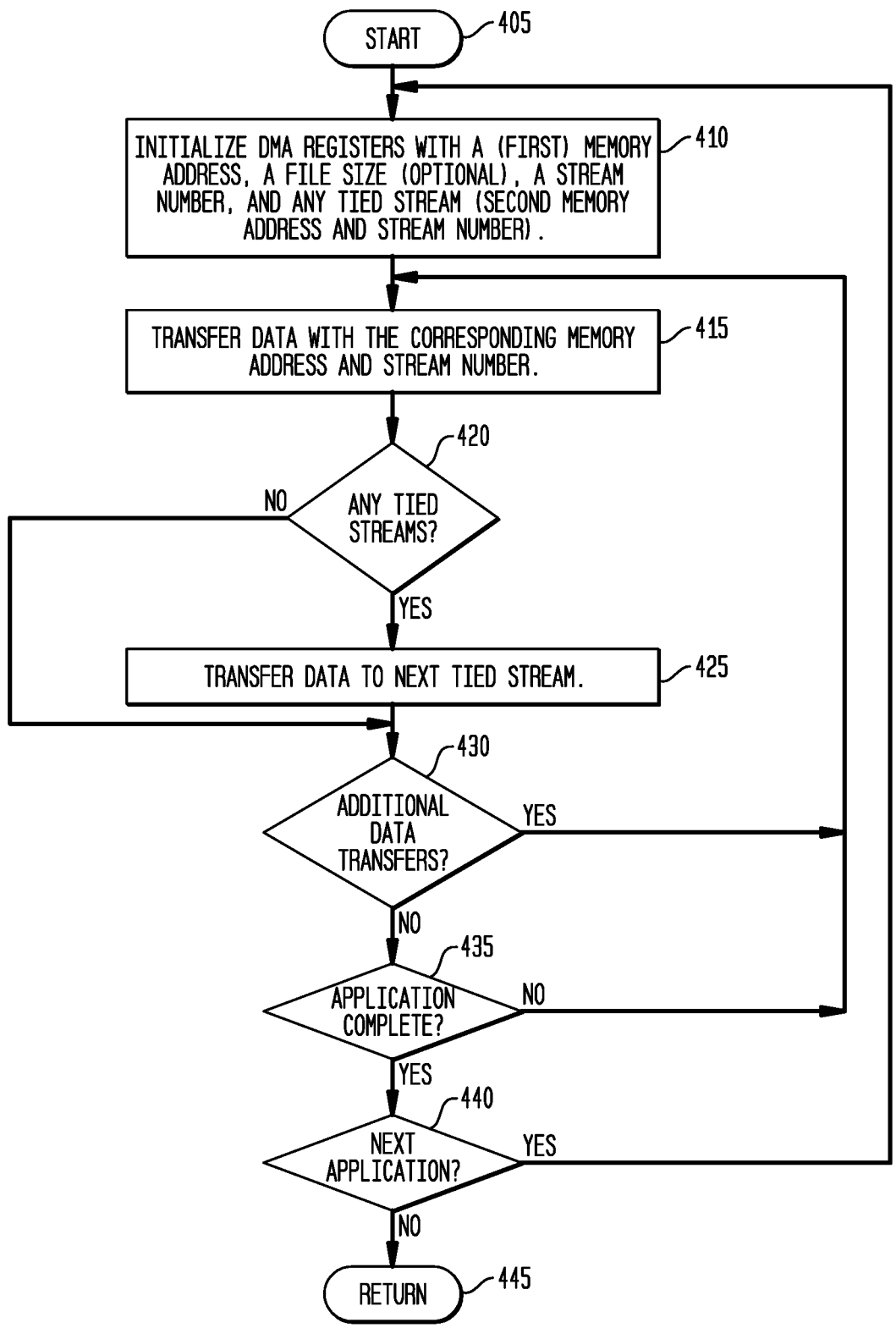
FIG. 7 is a flow diagram illustrating an exemplary or representative communication method embodiment.

FIG. 7 is a flow diagram illustrating an exemplary or representative method embodiment for data transfer within a system 100, 200, 300, 400, 800 and provides a useful summary. Beginning with start step 405, one or more DMA registers associated with any of the FPGAs 150, 160, 170 and their associated memories 190 are setup, step 410, with a memory (120, 190) address, a file size (as an option, and not necessarily required), a stream number, and any tie (or tied) stream number. Using the DMA engines for read and write operations, or using other available configurations within FPGAs 150, 160, 170, data is transferred between and among the FPGAs 150, 160, 170 using the designated addresses and stream numbers, step 415. When there are any tied streams, step 420, then the data is transferred to the next tied stream, step 425, as the case may be. When there are additional data transfers, step 430, the method returns to step 415, and the process iterates. Otherwise, the method determines whether the application is complete, step 435, and if not, returns to step 415 and iterates as well. When the application is complete in step 435, and there is another application to be run, step 440, the method returns to step 410 to set up the DMA registers for the next application, and iterates. When there are no more applications to be run, the method may end, return step 445.

The systems 100, 200, 300, 400, 800 as described above may be utilized quite advantageously to accurately and rapidly perform both exact and inexact searching, such as to solve the short read mapping problem referred to above and determine the location or locations in the reference genome to which each short read maps, generally with some degree of likelihood and with or without some degree of mismatching, such as with insertions, deletions, and substitutions of nucleotides (i.e., bases). The systems 100, 200, 300, 400, 800 may also be configured to provide several (e.g., the top one, two or three) inexact search results and/or partial search results, such as several alignment locations for a short read. The increased performance can be used to speed up inexact searching, including searching of queries in genomic texts or databases, or to allow the use of more sensitive or variant searching, such as mapping more variations up to a predetermined number of mismatches. The processes and configurations used for inexact searching by the systems 100, 200, 300, 400, 800 may also be applied advantageously to other bioinformatics problems, such as in proteomics, for example and without limitation. Various representative embodiments of the system 100, 200, 300, 400, 800 may also utilize differing amounts of involvement of the host computing system 105.

As mentioned above, as an important example, the sequencing machines determine the nucleotide sequence of short DNA fragments, typically a few tens to hundreds of bases, called "short reads", derived from randomly fragmenting many copies of the genome of one organism for which a "reference" genome sequence is already known. In these cases, the first step in the data analysis pipeline is the short read mapping problem: determining one or more locations in the reference genome to which each read maps with some degree of likelihood and/or some degree of mismatch. The problem is technically challenging for two reasons. First, speed is important simply due to the volume of data. For example, in human studies, mapping a billion reads from one subject to the human reference genome is routine. Second, the achieved sensitivity of the algorithm, which is the ability to successfully map sequences that are not completely identical to the reference, is an important consideration. These differences exist both because of technical errors in the sequencing machines (a frequent and uninteresting case) and because of genetic differences between the subject and the reference genome. The latter case is rarer and much more interesting—indeed it may be the entire purpose of the analysis or experiment, as it may reveal the cause of some inheritable disease or a cancer-related mutation. The cases are distinguishable because the sequencer errors are random while the genetic differences are not. Hence many mapped reads that consistently exhibit a difference with respect to the reference at a particular locus signal a genetic change, whereas occasional scattered differences are probably errors. This also drives the desire for more and more reads, since more data gives may yield more accurate variant-calling (e.g., libraries of variations).

Figure 8A:
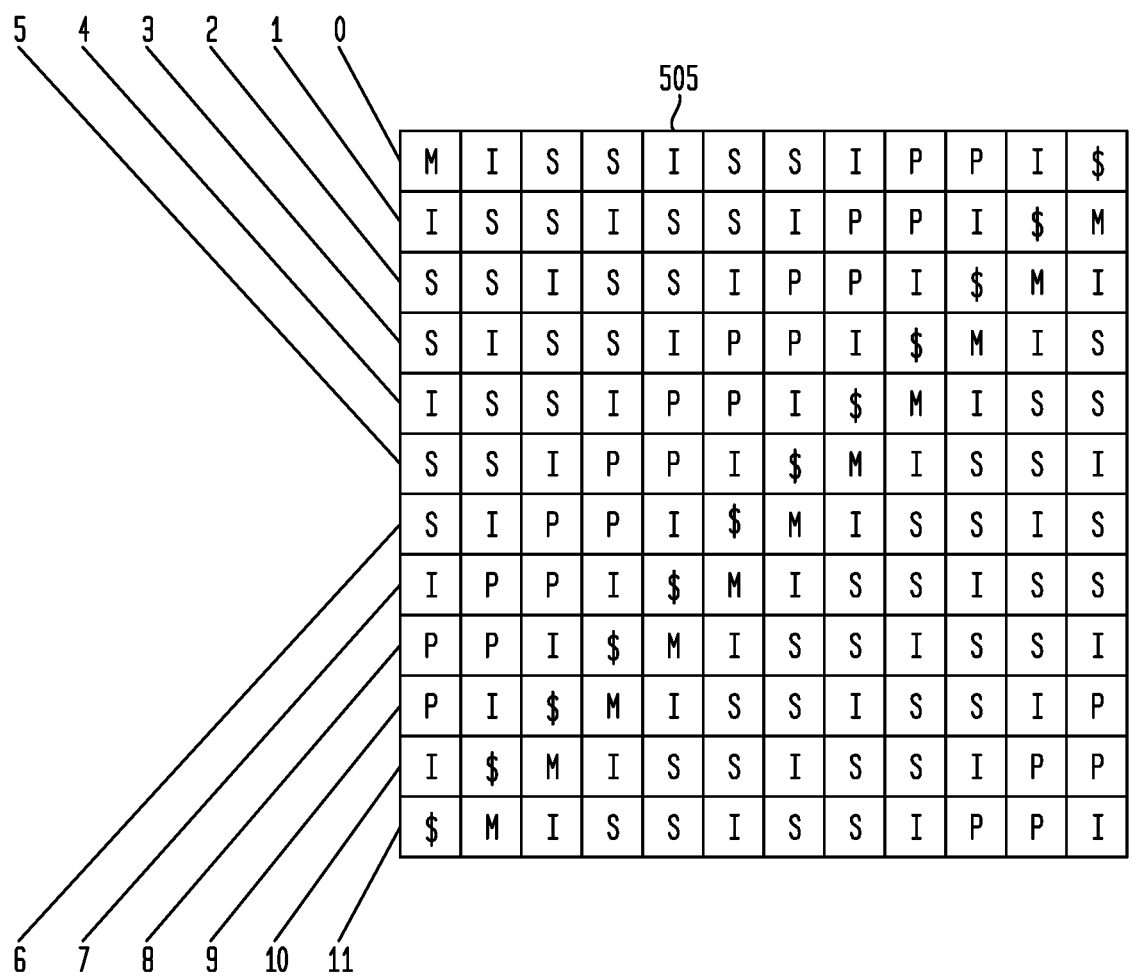
FIG. 8A and FIG. 8B, are diagrams illustrating an exemplary or representative construction of a BWT matrix, a sorted BWT matrix, and a BWT string.
Figure 8B:
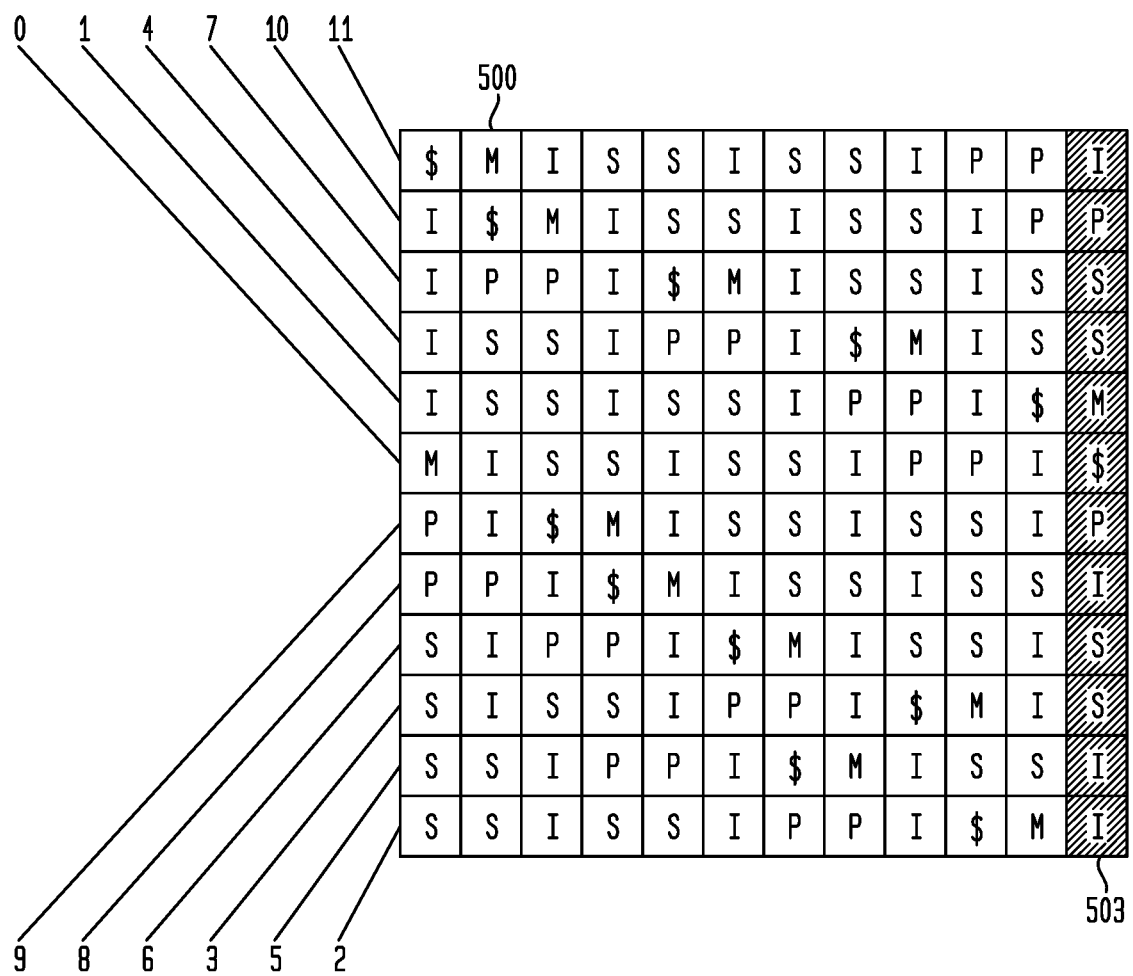
Figure 9C:
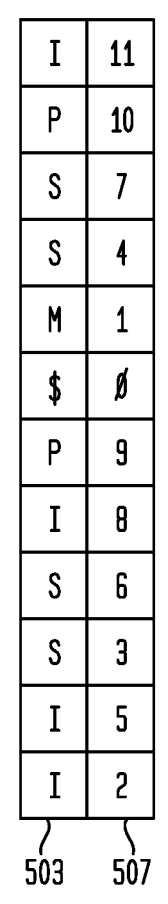
Figure 10:
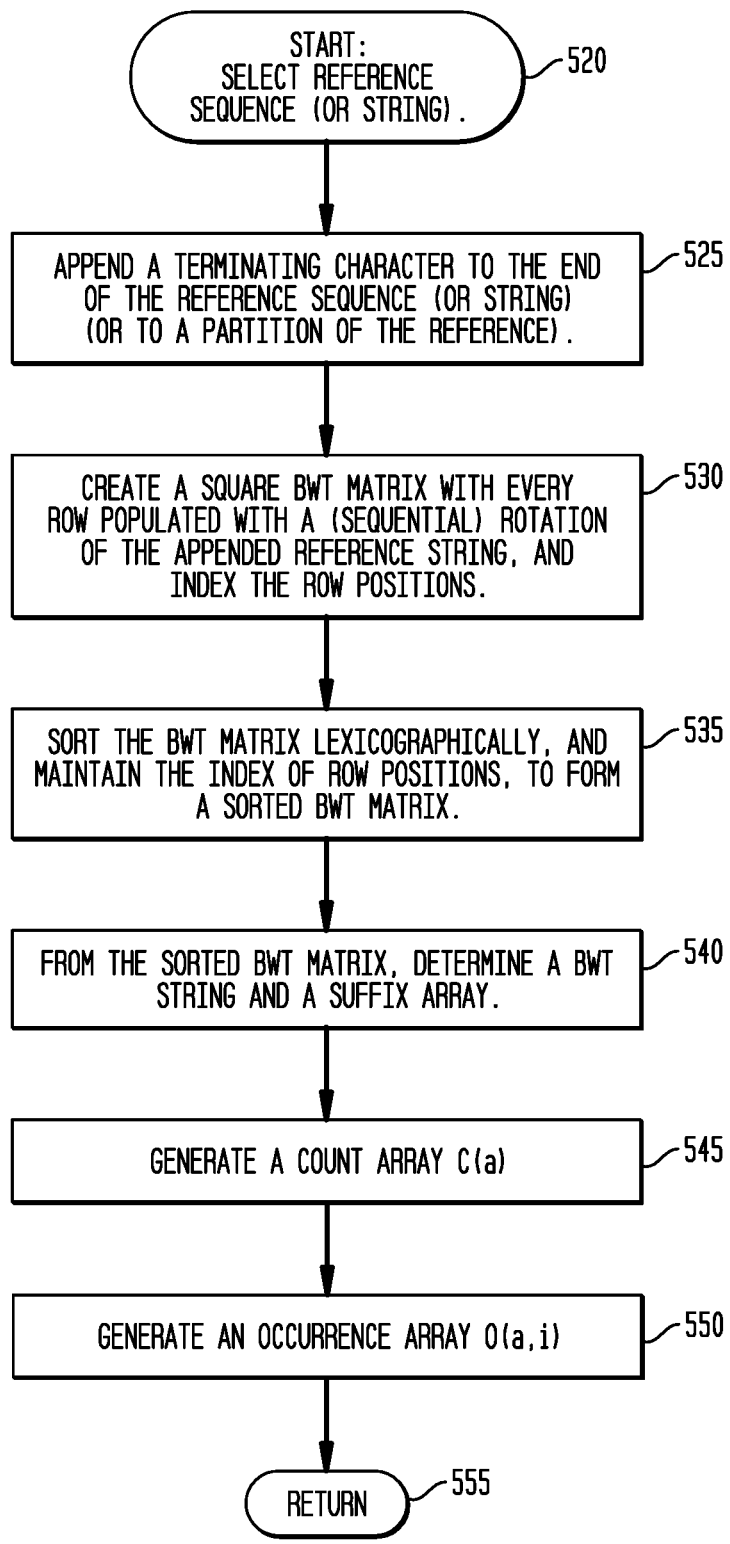
FIG. 10 is a flow diagram illustrating an exemplary or representative method embodiment for generating a reference BWT matrix and an FM-index for use in an accelerated inexact searching configurable logic (FPGA) embodiment.

FIG. 8A is a diagram illustrating an exemplary or representative construction of a BWT matrix 505. FIG. 8B is a diagrams illustrating an exemplary or representative sorted BWT matrix 500 (from the BWT matrix 505 of FIG. 8A) and a BWT string 503. FIG. 9A is a diagram illustrating an exemplary or representative count array, FIG. 9B is a diagram illustrating an exemplary or representative occurrence array, and FIG. 9C is a diagram illustrating an exemplary or representative BWT string 503 and an exemplary or representative suffix array 507, all constructed using the representative sorted BWT matrix 500 of FIG. 8B. FIG. 10 is a flow diagram illustrating an exemplary or representative method embodiment for generating a reference BWT matrix and a Ferragina-Manzini index ("FM-index") for use with an accelerated inexact searching configurable logic (FPGA) embodiment.

As described in greater detail below, the FM-index as utilized in the present disclosure comprises a count array (e.g., 510), an occurrence array (e.g., 515), a BWT string (e.g., 503), and a suffix array (e.g., 507). Those having skill in the art will recognize that the illustrated arrays and strings are for purposes of explanation, and that every such array and string comprising an FM-index will have or contain different content corresponding to the reference, e.g., an FM-index for the human genome sequence will be different than an FM-index for a nematode genome sequence, etc., for example and without limitation. As a result, any reference to an FM-index, for a selected reference sequence or string, shall be understood to mean and include a count array (e.g., 510), an occurrence array (e.g., 515), a BWT string (e.g., 503), and a suffix array (e.g., 507), created specifically for the corresponding reference sequence or string.

There are many ways to perform inexact searching, and one such method utilizes a data structure known as the Burrows-Wheeler Transform ("BWT") and an algorithm for efficiently searching an index based upon that data structure, known as the FM-index. The FM-index can be used for inexact searching because it has a comparatively low memory footprint, and all locations where the query exactly matches the reference can be found in time proportional to the length of the query. The inexact searching of the representative embodiments extends to any information which can be represented alphabetically or otherwise represented by an alphabet, of any kind, which can be sorted lexicographically, including the reference genome sequence utilized in bioinformatics, which can be represented by an alphabet of nucleotides (bases, typically as A, C, G, T (or U for an RNA sequence)). The search methodology implemented in a system 100, 200, 300, 400, 800 performs a depth-first search based upon suffix trees, and allows up to "M" mismatches, and an example may be implemented using an FM-index.

An FM-index of the reference is generated prior to any searching. Referring to FIG. 10, start step 520, a terminating character is appended to the end (tail) of the reference "string" of characters (or to each of the reference string partitions), step 525, creating a reference string with length N. For the purposes of this disclosure, and without a loss of generality, the reference may be viewed as a single string of characters. In practice, many types of databases can be converted to this representation for processing, including genetic sequences. For example, the entire human reference genetic sequence may be viewed as strings of billions of bases (nucleotides). The genome comprises multiple chromosomes, which can be concatenated together to form a single string. Similarly, the forward and reverse complement sequences can be concatenated together to form one string, or can be searched separately, for example. This terminating character (denoted as "$" as an example in FIGS. 8A and 8B) should not appear anywhere else in the reference string, and it is lexicographically smaller than all other characters in the reference string. As an example using the reference string of characters "MISSISSIPPI", the string with the appended terminating character becomes "MISSISSIPPI$", as illustrated in Row 0 of the BWT matrix 505 in FIG. 8A. It should also be noted, and indicated above and as discussed below, the reference string or sequence of characters may also be subdivided or otherwise partitioned, followed by performing the various steps to form an FM-index for each such partition.

In step 530, a square 2D BWT (505) matrix is formed, where each dimension is equal to the length (N) of the reference string or sequence. The reference string (with the terminating character appended) is placed in the first row of the matrix, row 0 as illustrated in FIG. 8A. To form the BWT matrix, every row of the matrix is then filled with every possible rotation of the appended reference string, generally sequentially, as illustrated in FIG. 8A, and each row is indexed or numbered, used to form a suffix array (as illustrated below). As will be described in greater detail below, an important feature of the BWT matrix (505) is then employed advantageously, namely, the number (or index) of each successive row in the BWT matrix (505) indicates the sequence position or location of the leading character of that row (in column 0). For example and without limitation, referring to FIG. 8A, the lead character (in column 0) in row 4, an "I", is located as the fifth character of the reference string "MISSISSIPPI", and the lead character (in column 0) in row 9, a "P", is located as the tenth character of the reference string "MISSISSIPPI". This information is maintained or indexed (in the suffix array (507), and used advantageously in the systems 100, 200, 300, 400, 800 for rapid inexact and exact searching.

After the BWT matrix (505) has been completely formed in step 530, the rows of the BWT matrix (505) are sorted lexicographically (step 535) to form a sorted BWT matrix (500), e.g., smallest to largest, such that after the sort the row that begins with the appended character $ should be in the first row of the resulting matrix (sorted BWT matrix 500). Note that once the BWT matrix (505) is sorted, the $i^{th}$ lexicographically smallest suffix of the reference string is in the $i^{th}$ row of the sorted BWT matrix (500). From the sorted BWT matrix (500), two parts of the FM-index are available and may be determined, namely, the BWT string (503) and the suffix array (507), step 540, and as illustrated in FIG. 9C. More particularly, following the sort, the last column of the sorted BWT matrix 500 is referred to as the BWT string 503, which is read from top to bottom. Also in step 540, by maintain or tracking the sorting of the original rows of the BWT matrix (505), a suffix array (507) is created. FIG. 8B illustrates an example of the sorted BWT matrix (500) and BWT string 503 construction for the reference string "MISSISSIPPI". FIG. 8B also illustrates the retention, for use in forming a suffix array (507), of the row numbering of the original BWT matrix (505), which is illustrated as a suffix array 507 (with BWT string 503) in FIG. 9C.

It should be noted that a BWT matrix (500, 505) may be quite large; for example and without limitation, a BWT matrix (500, 505) for a reference genome may be 3 billion by 3 billion bases. As a result, the reference string or sequence may be partitioned or divided into a plurality of smaller sections or parts, with each of the steps described in FIG. 10 performed for each such partition, with corresponding creation of an FM-index for each partition of the reference. The FM-index for each reference partition may then be utilized for searching, typically in parallel.

In steps 545 and 550, a count array and an occurrence array are generated for the sorted BWT matrix (500), and more particularly, the BWT string 503. The first, count array, C(a), holds the number of characters in the original reference string that are lexicographically smaller than "a". The second, occurrence array, O(a,i), stores a count of the number of occurrences of "a" in the first "i" characters of the BWT string 503. Examples of count and occurrence arrays for the reference string "MISSISSIPPI" are illustrated, respectively, in FIGS. 9A and 9B.

As an option, as mentioned above, when the reference has been partitioned, corresponding FM-indexes are generated, one for each partition, i.e., each having a corresponding BWT string and count, occurrence, and suffix arrays. Each of these FM-indexes may be distributed among a plurality of computing modules 175, 180, 185, 190, 115 and stored in corresponding memories 190, thereby providing for each FPGA 150, 160, 170 to perform exact or inexact searching against the corresponding portion of the reference stored in a memory 190. For example, the plurality of FM-indexes may be stored in host system memory 120, with the host CPU 110 configuring the DMA engines of the FPGAs 150, 160, 170, as discussed above, which may then obtain the corresponding FM-index data from the host system memory 120 for use in exact or inexact searching and store it in memory 190. This distribution of the FM-index (and also possibly the reference (e.g., reference genome sequence)) is only required to be performed once for as long as the inexact searching application is to be performed, as multiple queries, such as sets short reads, are to be mapped using the same reference FM-index.

After the construction of the FM-index, it can be used to search for substrings of the original reference string, all or part of which may be performed by the systems 100, 200, 300, 400, 800. For example and without limitation, initial searching may be performed by the host computing system 105, with partial results (as SA intervals) provided to the systems 100, 200, 300, 400, 800, and with the more precise or exact searching performed by the systems 100, 200, 300, 400, 800, generally in linear time for exact searching. In another embodiment, all of the query searching is performed by the systems 100, 200, 300, 400, 800. In another embodiment, all of the query searching is performed by the systems 100, 200, 300, 400, 800, with the host computing system 105 providing modified queries (e.g., with substitutions, insertions, or deletions) in response to a search result indicating that no exact match had been found. In yet another embodiment, all of the query searching is performed by the systems 100, 200, 300, 400, 800, with the systems 100, 200, 300, 400, 800 also providing modified queries (e.g., with substitutions, insertions, or deletions) when no exact match had been found previously, such as modified queries up to a predetermined number of mismatches.

FIG. 11A and FIG. 11B, are diagrams illustrating an exemplary or representative query search in a representative FM-index and SA intervals for the query search, using the FM-index (and illustrated using the sorted BWT matrix 500) from the previous examples. Using the FM-index, and assuming that "S" is a substring of the reference string "R", then all occurrences of "S" in "R" will appear in sequential rows in the sorted BWT matrix (500) (because the sorted BWT matrix (500) is sorted lexicographically). A lower bound and upper bound on the interval of the FM-index may to then be provided where the substring "S" occurs or is located in the reference "R", which is called the suffix array interval ("SA interval"). The lower bound of the SA interval is denoted as "k" and the upper bound is denoted as "l".

This SA interval of substring "S" may be computed in linear time proportional to the length of the substring "S". For example, starting with the empty substring, S={}, that substring may be found anywhere in the FM-index, so the lower bound is the first valid row of the matrix (k=1) and the upper bound is the last valid row of the matrix (l=N−1), as illustrated in FIG. 11B (575). Next, a single character, such as a base, is prepended from the tail (end) of the query to the current substring (S), and the new or next lower and upper bounds of the FM-index are computed, such as by using the occurrence and count arrays:

$$k=C(a)+O(a, k-1)+1; \text{ and} \quad (1)$$

$$l=C(a)+O(a, l). \quad (2)$$

Using this mechanism, a single character from the query is iteratively prepended to the current sub string. As long as the computed lower and upper bounds do not cross, i.e., k≤l, then the newly formed substring is contained within the original reference string. If all characters (e.g., bases) of the query have been prepended to the substring and the SA interval is greater than or equal to one (1), i.e., l−k+1≥1, then the query is found within the reference string "R". This iterative process is illustrated in FIG. 11B, for the empty substring query, S={} (575), the single character substring "S" (585), the two character query substring "IS" (570), and the three character query substring "SIS" (580), with an SA interval=1 and converging on a single row 9 of the FM-index, which was indexed (in suffix array 507) as the original row 3 of the BWT matrix (505) (i.e., the fourth row when counting begins with "1"), indicating that the three character query substring "SIS" (580) begins with the fourth character of the reference "MISSISSIPPI" (or the third character, when counting begins with "0").

These calculations and corresponding searches may be performed advantageously in a system 100, 200, 300, 400, 800. FIG. 12 is a block diagram illustrating an exemplary or representative parallel configuration for a system 100, 200, 300, 400, 800, with an input query data partition (and optionally using a reference data partition, as well, as discussed above). As illustrated, the host computing system 105 has created "n" partitions of the queries to be searched, and as discussed above, by configuring the corresponding DMA engines, each of the partitions 1 through "n" has been distributed to corresponding computing modules 175, 180, 185, 195, 115, or each set of queries (as a partition) has been streamed to each computing module 175, 180, 185, 190, 115. For streaming queries, the queries may be buffered within the corresponding FPGAs 150, 160, 170, for example and without limitation. For purposes of illustration, other details of the various computing modules 175, 180, 185, 195, 115 and systems 100, 200, 300, 400, 800 have been omitted in FIG. 12.

To improve the performance of the system 100, 200, 300, 400, 800, if the queries are to be stored (rather than streamed), the set or sets of queries to be searched are partitioned across multiple memories 190, both within each computing module 175, 180, 185, 195, 115 and across multiple computing modules 175, 180, 185, 195, 115, to allow concurrent memory operations and reduce the memory footprint required per node in the system 100, 200, 300, 400, 800. This partitioning typically extends across multiple memories 190 on multiple computing modules 175, 180, 185, 195, 115 with corresponding FPGAs 150, 160, 170, and may be performed as described above by the host CPU 110 configuring the DMA engines of the FPGAs 150, 160, 170, to read or otherwise obtain the corresponding partition from the host memory 120. Each computing module 175, 180, 185, 195, 115 independently performs the calculations and corresponding inexact searching described above and generates corresponding results, which are then transmitted back to the host computing system 105, using the data transfer methodology described above, and the host computing system 105 may then merge the search results from each of the computing modules 175, 180, 185, 195, 115.

Other types of partitioning are also within the scope of the disclosure. As described in the related U.S. patent application ser. No. 14/201,824, incorporated herein by reference, the reference (and each corresponding FM-index) may also be partitioned across the computing modules 175, 180, 185, 195, 115, with each computing module 175, 180, 185, 195, 115 performing searching within its reference, FM-index partition, and passing the results and the query to the next computing module 175, 180, 185, 195, 115 for searching in the next reference partition, and so on, sequentially "daisy-chaining" the search operations across multiple computing modules 175, 180, 185, 195, 115, using multiple FM-indexes.

Figure 13:
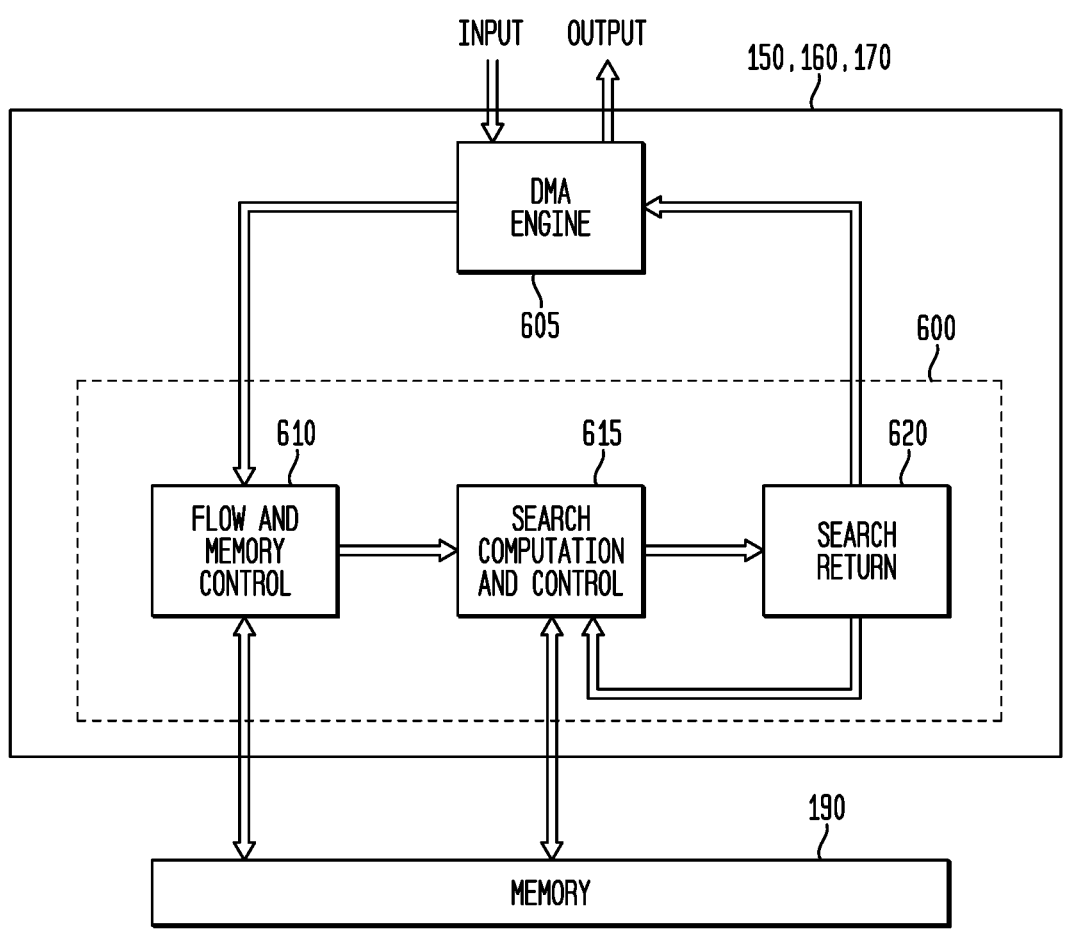
FIG. 13 is a system configuration block diagram illustrating an exemplary or representative inexact search FPGA configuration embodiment.

FIG. 13 is a system configuration block diagram illustrating an exemplary or representative exact and/or inexact search FPGA configuration embodiment 600, which may be implemented using any of the FPGAs 150, 160, 170 and memory (or memories) 190 (such as DDR3) on any of the computing modules (boards or cards) 175, 180, 185, 195, 115. More specifically, each of the various "configuration blocks" described herein are one or more configurations of an FPGA 150, 160, 170, and these one or more configurations may be loaded into the FPGA 150, 160, 170 as described above. In addition, any of the data transfers between and among the FPGAs 150, 160, 170 may be performed as described above, such as for transferring data between partitions, for example and without limitation.

Figure 14:
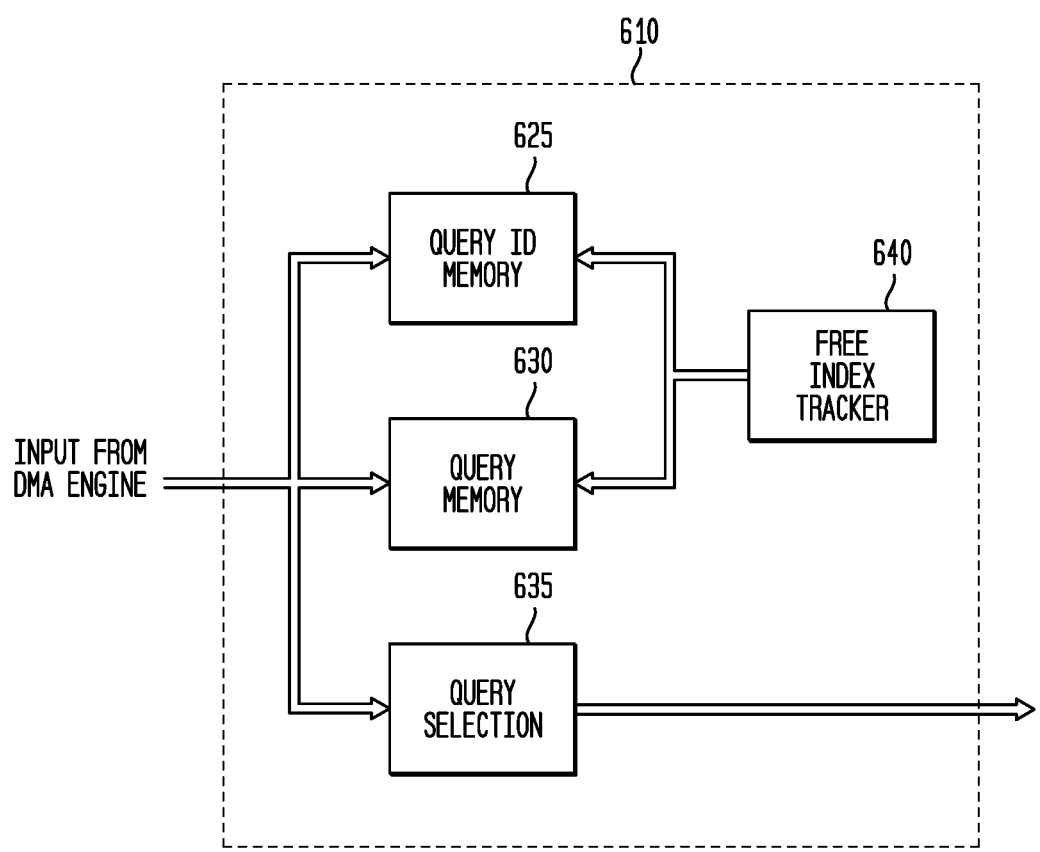
FIG. 14 is a system configuration block diagram illustrating in greater detail an exemplary or representative flow and memory control configuration block for an inexact search FPGA configuration embodiment.

The set of queries to be searched, or a part or partition of the set of queries, along with the reference FM-index, or a part or partition of the reference FM-index (when the reference has been partitioned accordingly), has been stored in memory 190, which may be comprised of several memory ICs. Alternatively, and as illustrated in FIG. 14, the set of queries (or query partition) is held in memory internal to the FPGA 150, 160, 170, such as within available buffers or registers, while the FM-index is stored in memory 190. If a host computing system 105 has also been utilized for initial searching, then a current (BWT) SA interval is also provided with each query and stored in memory 190 or in memory internal to the FPGA 150, 160, 170. In addition, if desired (although not required) and depending upon the selected embodiment, the corresponding reference (e.g., genome sequence or part of the reference genome sequence) could also be stored in memory 190, for use in subsequent alignment processing, for example and without limitation.

As illustrated in FIG. 13, the FPGA configuration embodiment 600 comprises a DMA engine 605 (as discussed above), which provides (to the other configuration modules or to the memory 190) input data or an input data stream having one or more queries and the FM-index (and any current (BWT) SA intervals or partial results) received from the PCIe communication lines 130 (e.g., a short read sample from host memory 120), which may then be stored them in memory 190 (e.g., the FM-index) or stored within memory internal to the FPGA 150, 160, 170. The DMA engine 605 also provides or transmits output data or an output data stream (e.g., having the search results, such as an SA interval for an exact match or a current candidate location of the short read in the reference genome) on the PCIe communication lines 130, which may then be provided to another FPGA configuration embodiment 600 for additional search or other processing (e.g., to further determine one or more reference genome locations for the short read) or to the host computing system 105 (e.g., as the search result, such as an exact match, an inexact match, etc.). The FPGA configuration 600 further comprises the configurations which perform the exact and/or inexact searching using the FM-index, namely, a flow and memory control configuration block 610, a search computation and control configuration block 615, and search (selection) return configuration block 620. Each of the flow and memory control configuration block 610, search computation and control configuration block 615, and search (selection) return configuration block 620 are illustrated in greater detail in FIGS. 14-16. The FPGA configuration 600, in representative embodiments, will return a search result for each query using a depth-first approach, which may consist of an exact or inexact match (e.g., after sequentially prepending the next character and performing the calculations described above, the beginning of the query is reached and the entire query has aligned to the reference exactly or with a predetermined number "M" of allowable mismatches), or a result consisting of no match (e.g., an invalid SA interval is reached indicating that the query does not align to the reference either exactly or within the allowed level "M" of mismatches).

The input data or data stream may be considered to have a plurality of "queries" which are to be searched, e.g., having one or more short reads from a sample for analysis. Depending upon the selected embodiment, the input data stream includes a plurality of queries, with each query having an identification number, so that results may be returned out of order from each of the various computing modules 175, 180, 185, 195, 115. As mentioned above, the input data or data stream may also include corresponding current SA intervals, if the host computing system 105 has done some initial searching and generated SA intervals as partial results. This input data or data stream is input into flow and memory control configuration block 610, which typically selects one query at a time, and tracks its other data (metadata), such as any query identification number and current SA interval, and provides the selected query (and current SA interval, if any) to the search computation and control configuration block 615.

FIG. 14 is a system configuration block diagram illustrating in greater detail an exemplary or representative flow and memory control configuration block 610 for an inexact search FPGA configuration embodiment. As illustrated in FIG. 14, an exemplary or representative flow and memory control configuration block 610 comprises one or more memory tracking or indexing configurations, illustrated as free index tracking configuration block 640, and further comprises a query selection configuration block 635. As illustrated, flow and memory control configuration block 610 also comprises query identification ("ID") memory 625 and query memory 630, as part of the internal memory available within an FPGA 150, 160, 170. In an alternative embodiment, some of the memory 190 may be utilized as query identification ("ID") memory 625 and/or query memory 630, it being understood that these are convenient descriptions for discussing the use of the memory 190 for the various queries and tracking of queries. Query memory 630 is utilized to store the actual query sequences, and provide for the reading of a single character, such as a single base, from each query, for use in subsequent computations (e.g., read query ID 5, $20^{th}$ base). Query identification (ID) memory 625 stores the corresponding unique ID associated with each query.

In a representative system 100, 200, 300, 400, 800, a fixed buffer (memory) space is allocated for the queries (within the FPGA 150, 160, 170). A set of indices are maintained to provide for reference to one selected query versus another query. All reads are indexed to refer to the queries in any part of the system 100, 200, 300, 400, 800 by the corresponding index number for the query. The free index tracking configuration block 640 tracks the indices that have not yet been allocated, essentially indicating which slots may be empty and available in the query memory 630. The representative query selection configuration block 635 provides flow control, selecting a query and providing it to the search computation and control configuration block 615, so that too much data is not pushed into the search computation and control configuration block 615 with a fixed amount of memory available.

Figure 15:
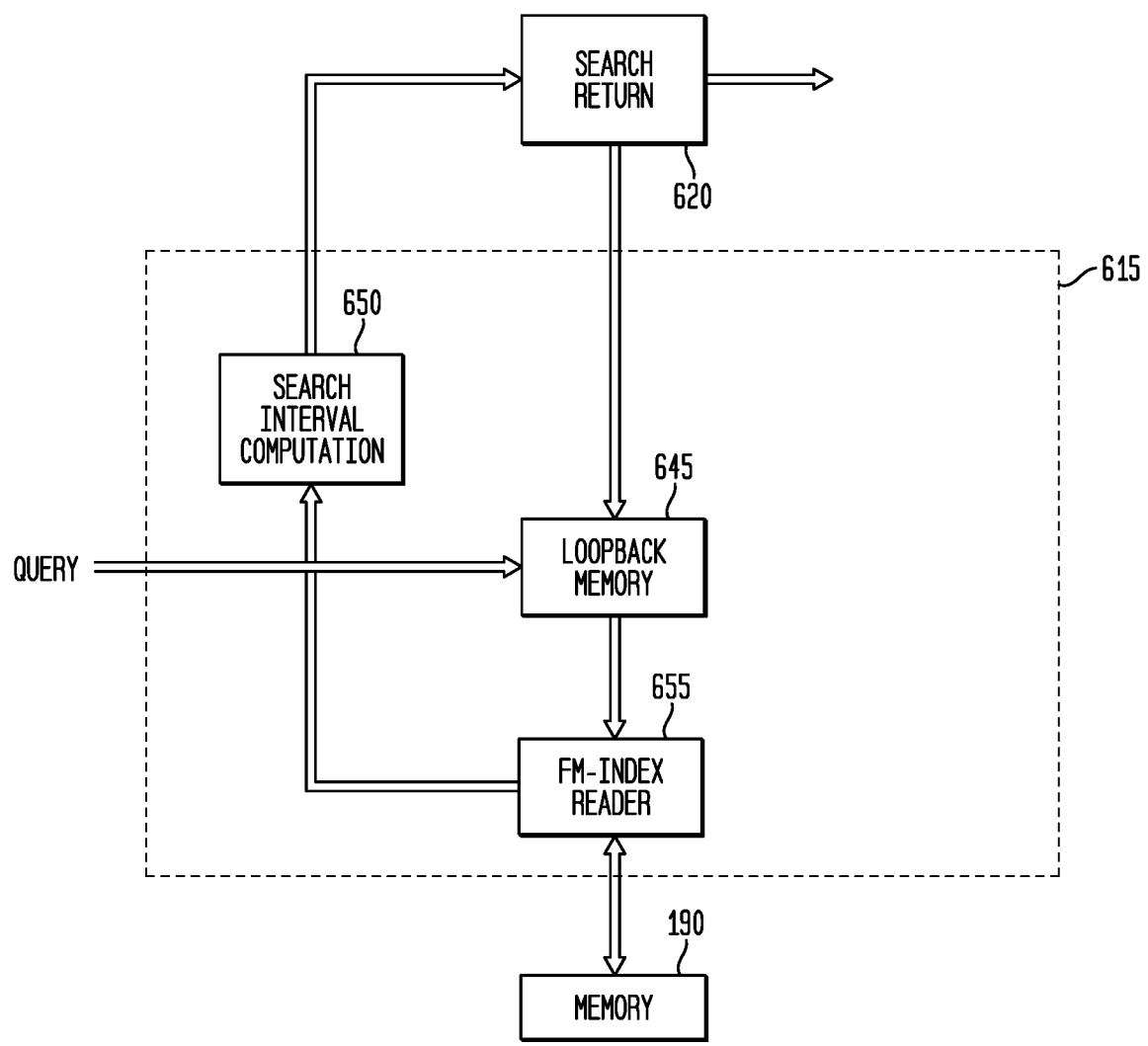
FIG. 15 is a system configuration block diagram illustrating in greater detail an exemplary or representative search computation and control configuration block for an inexact search FPGA configuration embodiment.

FIG. 15 is a system configuration block diagram illustrating in greater detail an exemplary or representative search computation and control configuration block 615 for an inexact search FPGA configuration embodiment. An exemplary or representative search computation and control configuration block 615 comprises a loopback memory configuration block 645, a search interval computation configuration block 650, and an FM-index reader configuration block 655. The loopback memory configuration block 645 receives the query to be searched from the query selection configuration block 635, injecting new work into the searching system. As query searching continues, the loopback memory configuration block 645 controls whether the FPGA 150, 160, 170 will keep processing the same query or if a new query may be accepted (e.g., the searching for a previous query has been completed or concluded). A new SA interval will be computed for every piece of data received by the loopback memory configuration block 645, and may be implemented as a FIFO (first in, first out) control or memory.

The FM-index reader configuration block 655 reads from memory 190 and is configured with the structure of the FM-index stored in memory 190, i.e., configured to automatically access or "know" the structure of the FM-index stored in memory 190.

The FM-index reader configuration block 655 utilizes the query received from the loopback memory configuration block 645, reads from the FM-index stored in memory 190 and extracts the information currently required for search computation.

The search interval computation configuration block 650 receives the query and portion of the FM-index read by the FM-index reader configuration block 655 and computes a new or next SA interval for the query. In a representative embodiment, the search interval computation configuration block 650 (generally concurrently) computes a plurality of SA intervals as partial results, one SA interval for each possible character for a selected prepended position in the query substring. For example, if the query sub string is a DNA sequence consisting of GTTCA, four SA intervals are computed (concurrently) for the next prepending position, namely, an SA interval for each of AGTTCA, CGTTCA, GGTTCA, and TGTTCA. The query memory 630 is then read to determine what the actual character is in the query for that selected position in the string or sequence, and the computed SA interval for that character is selected. Continuing with the example, if the next base in the sequence is T, then the SA interval partial result for TGTTCA is selected and provided to the search (selection) return configuration block 620.

Figure 16:
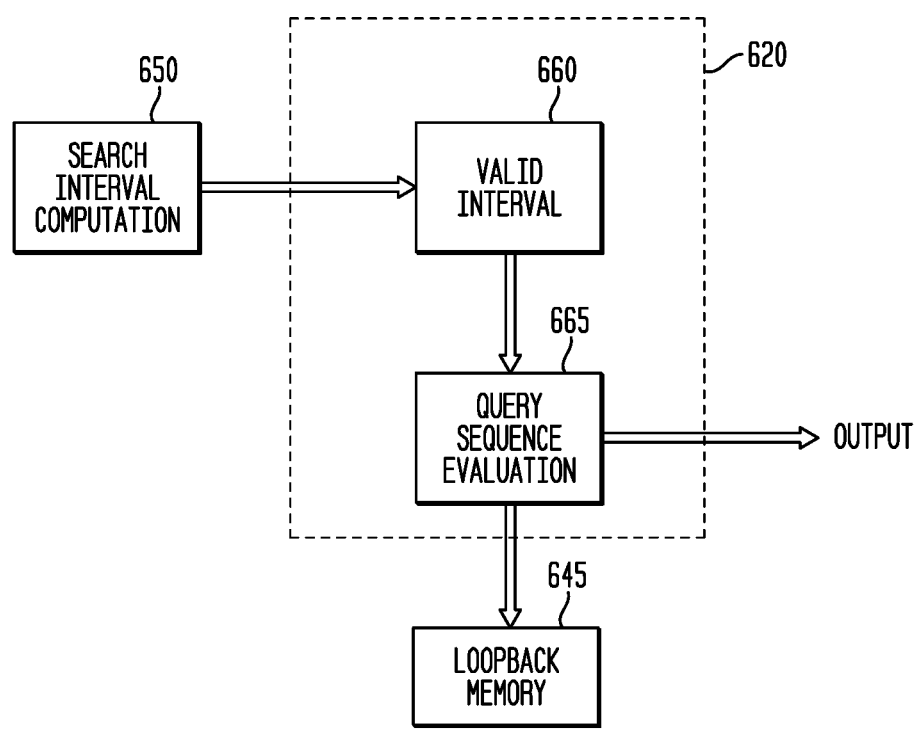
FIG. 16 is a system configuration block diagram illustrating in greater detail an exemplary or representative search return configuration block for an inexact search FPGA configuration embodiment.

FIG. 16 is a system configuration block diagram illustrating in greater detail an exemplary or representative search (selection) return configuration block 620 for an inexact search FPGA configuration embodiment. A search (selection) return configuration block 620 comprises a valid SA interval configuration block 660 and a query sequence evaluation configuration block 665. The valid SA interval configuration block 660 determines whether the SA interval received from the search interval computation configuration block 650 is valid, i.e., greater than or equal to one. The query sequence evaluation configuration block 665 determines if the beginning of the query sequence has been reached (from the successive prepending of a character to the search substring). When the SA interval is valid and when the beginning of the query has been reached, the query search has been completed and a valid search result has been found, and the search result may be output. In various representative embodiments, this first type of search result for a completed search for a selected query may be an SA interval, or may be an actual location in the reference sequence, for example and without limitation, e.g., a sequence location in the reference genome for a short read, or more simply the SA interval that may be utilized (with the suffix array) to determine the location. The output is provided (typically via DMA engine 605) as output data or an output data stream, such as on PCIe lines 130 for delivery to the host computing system 105 (or to another computing module 175, 180, 185, 195, 115 or FPGA 150, 160, 170).

If the SA interval is zero or negative, i.e., not valid, the search for the query is also complete, but no positive search result (e.g., a sequence alignment) has been found, and that result is also provided as output, as a second type of search result indicating that no match has been found. In that event, the host computing system 105 (or the FPGA 150, 160, 170 or another computing module 175, 180, 185, 195, 115) may modify one or more characters of the query, such as by substituting, inserting or deleting a character, to provide inexact searching with an allowable number "M" of mismatches. The the new, modified query is then transmitted back to the computing modules 175, 180, 185, 195, 115 for continued search processing. The host computing system 105 (or computing module 175, 180, 185, 195, 115) also typically maintains a stack or list of these various queries.

When the SA interval is valid, but the first (beginning) character of the query has not yet been processed, the newly computed SA interval is provided to the loopback memory configuration block 645, a counter is decremented, and the computation process continues, reading from the FM-index using FM-index reader configuration block 655, computing the next set of SA intervals in the search interval computation configuration block 650, and selecting the SA interval corresponding to the character in the current prepended position read from the query.

Figure 17:
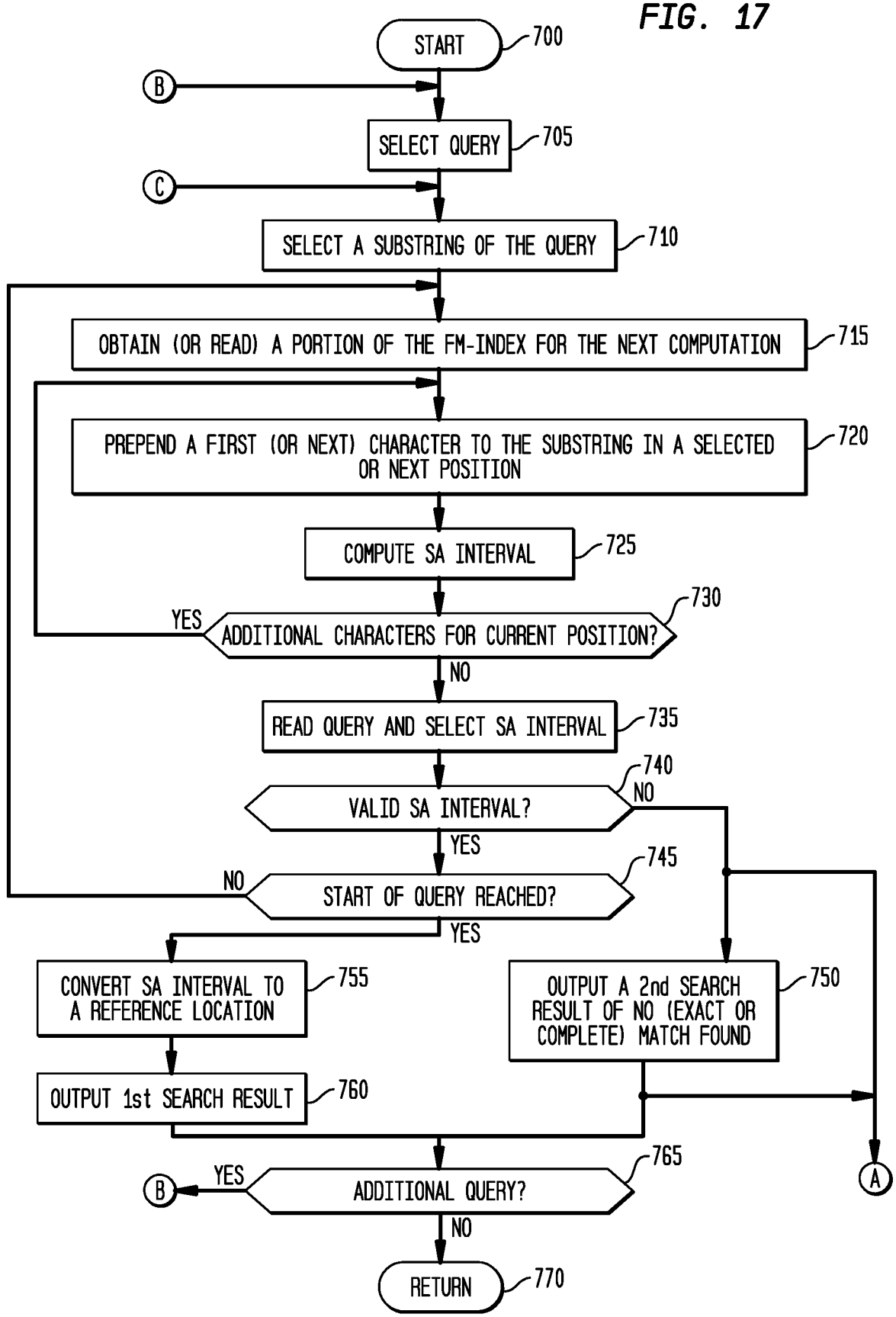
FIG. 17 is a flow diagram illustrating an exemplary or representative first method embodiment for accelerated exact searching using a configurable logic (FPGA) embodiment.

FIG. 17 is a flow diagram illustrating an exemplary or representative method embodiment for accelerated exact searching using a configurable logic (FPGA) embodiment, and provides a useful summary. Beginning with start step 700, an FPGA 150, 160, 170 selects a query, step 705, and typically selects a substring (or subsequence) of the query for searching, step 710. The FPGA 150, 160, 170 obtains or reads a corresponding part of the FM-index, step 715. A next character is then prepended to the substring in a selected or next position, step 720, and a corresponding SA interval is calculated, step 725. When there are additional characters (such as bases) that could be prepended in the current position, step 730, the FPGA 150, 160, 170 iterates, returning to step 720 to prepend the next character in the same position in the substring and calculate a corresponding SA interval in step 725. It should be noted that these steps 720, 725, 730 are typically combined and done in parallel, and are illustrated as part of a loop to show a conditional logic flow. When there are no additional characters for prepending in that position, the FPGA 150, 160, 170 reads the query for that substring position and selects the corresponding SA interval (from the plurality of SA intervals computed in step 725 for each available character for the string position), step 735.

The FPGA 150, 160, 170 then determines whether the SA interval is valid, step 740, and if not, either returns a search response that no valid match has been found, step 750, or proceeds to step 775 (illustrated in FIG. 18 for inexact searching), depending upon the selected embodiment. In response, for example and as illustrated in FIG. 18, the host computing system 105 (or one or more of the FPGA 150, 160, 170) may modify the query, such as by one or more character (e.g., base) insertions, deletions, or substitutions, step 765, and the method iterates using the new modified query, returning to step 710 (or step 705, if the modified query is merely included in a queue or stack for searching by the FPGA 150, 160, 170, such as when searching is performed out of order).

When the SA interval is valid, the FPGA 150, 160, 170 determines whether the beginning of the query has been reached, i.e., whether there are additional characters remaining in the query for searching, step 745, and if so, the FPGA 150, 160, 170 iterates, returning to step 715 to read the next portion of the FM-index and prepend the next characters (generally in parallel) in a next position in the substring (or sequence). When the beginning of the query has been reached in step 745, as an option, the SA interval is converted to a reference location, step 755, such as a location in the reference genome sequence for a short read. The search result is then output, step 760, such as the reference location or the SA interval. The FPGA 150, 160, 170 then determines whether there is any additional query for searching; if so, the methodology iterates, with the FPGA 150, 160, 170 returning to step 705, and if not, the method may end, return step 770.

Figure 18:
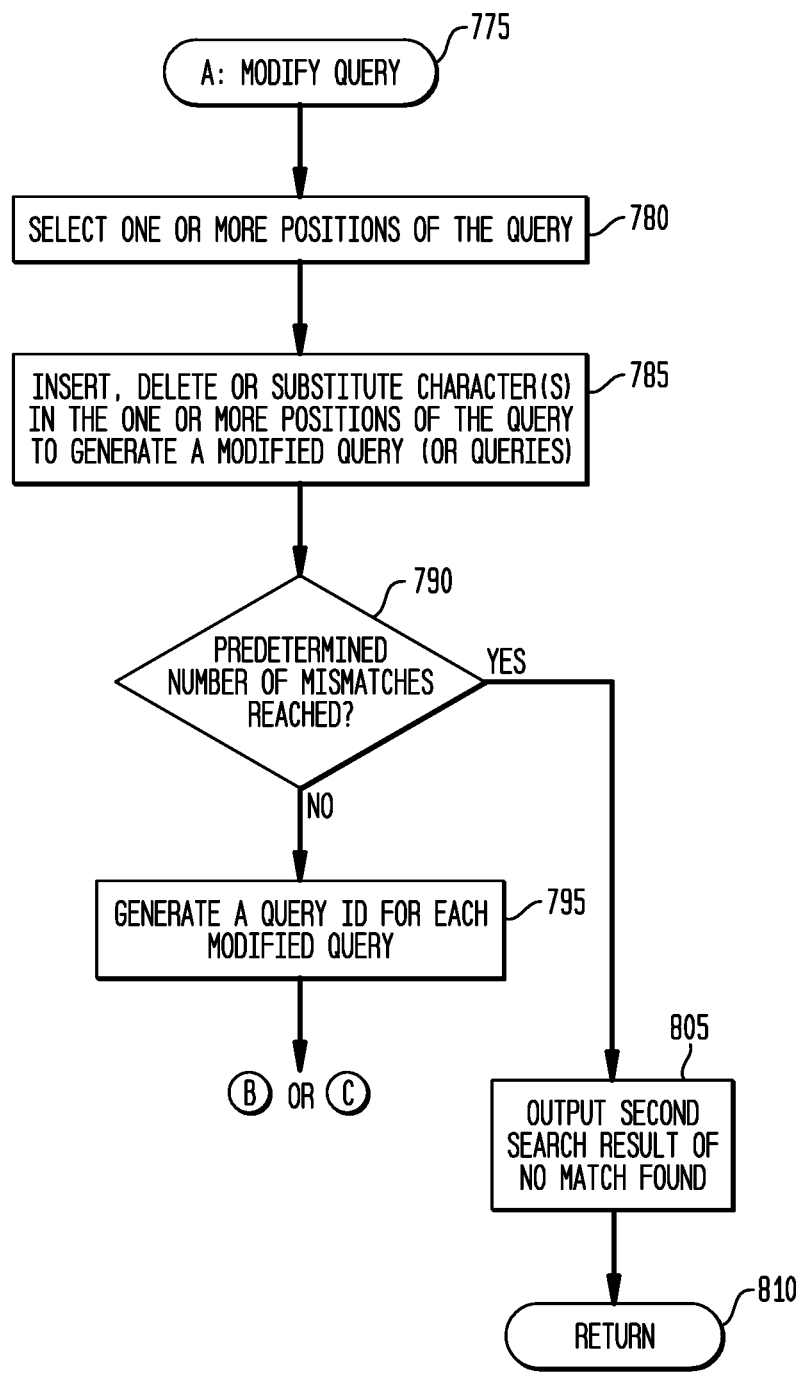
FIG. 18 is a flow diagram illustrating an exemplary or representative second method embodiment for accelerated inexact searching using a configurable logic (FPGA) embodiment.

FIG. 18 is a flow diagram illustrating an exemplary or representative second method embodiment for accelerated inexact searching using a configurable logic (FPGA) embodiment. As illustrated in FIG. 18, when an exact match has not been found (following step 740 and/or step 750 illustrated in FIG. 17), for inexact searching, the method proceeds to step 775 for modification of the query. One or more positions are selected in the query for modification, step 780, and in those one or more positions, one or more characters are inserted, deleted, or substituted to generate one or more modified queries, step 785. Provided a predetermined number of mismatches has not been exceeded, step 790, a query ID (or IDs) are generated for the modified query (or queries), step 795, and the search process may recommence with the modified query (or queries), returning to step 705 (or 710). If the predetermined number of mismatches has been exceeded in step 790, the second search result (of no match found) is provided, step 805, and the method of inexact searching may end, return step 810. As mentioned above, this process of query modification for inexact searching may be performed either by the host computing system 105 or the various computing modules 175, 180, 185, 195, 115.

Figure 19:
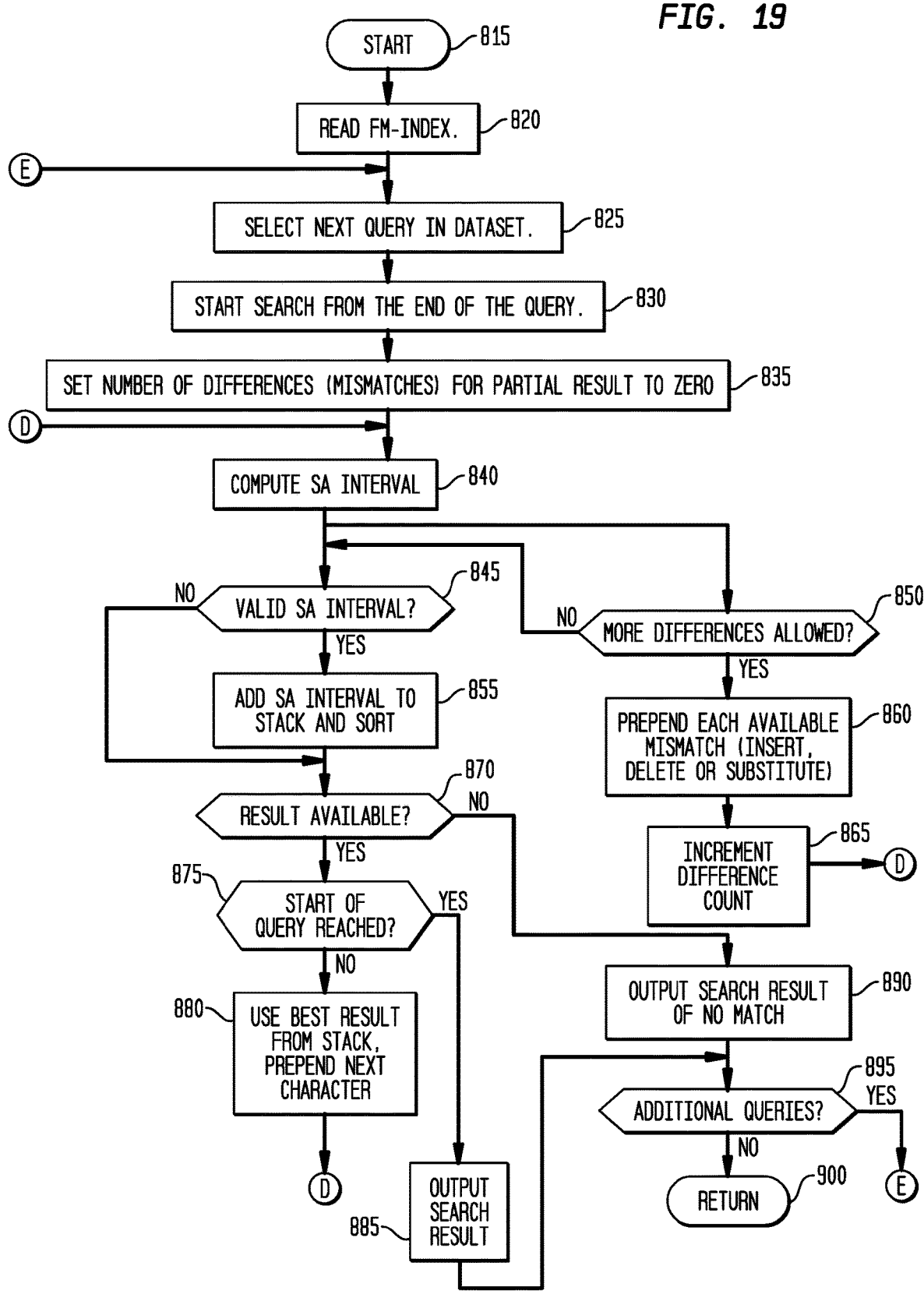
FIG. 19 is a flow diagram illustrating an exemplary or representative third method embodiment for accelerated inexact searching using a configurable logic (FPGA) embodiment.

FIG. 19 is a flow diagram illustrating an exemplary or representative third method embodiment for accelerated inexact searching using a configurable logic (FPGA) embodiment, and emphasizes the parallel computation available in the various FPGA 150, 160, 170 embodiments and FPGA configuration embodiment 600. Beginning with start step 815, the FM-index is read, step 820, and a next query in the dataset is selected, step 825. The search is started from the end of the query, step 830, and the number of differences (mismatches) for the partial result for the query is set to zero, step 835. The SA interval is computed, step 840, and if valid, step 845, the SA interval is added to a stack (e.g., maintained within the FPGA 150, 160, 170 or a memory 190), which is sorted, keeping the currently best on the top of the stack, step 855. When more differences are allowed, step 850, each available or possible mismatch is inserted, deleted, or substituted in the query, step 860, the difference count is incremented, step 865, and SA intervals are computed for each of these modified queries, returning to step 840, and when valid (step 845), also added to the sorted stack, step 855. When a result from the stack is available, step 870, and the end of the query has not been reached, the currently best result (or partial result) from the stack is utilized and a next character is prepended, step 880, and the method iterates, returning to step 840 to calculate the SA interval for the prepended query. When a result is not available from the stack in step 870, the second result (of no match) is output, step 890. When a result is not available from the stack in step 870 and when the end of the query has been reached in step 875, the result (e.g., the SA interval) is output, step 885. Following steps 885 and 890, when there are one or more additional queries, step 895, the method iterates, returning to step 825, and otherwise, the method may end, return step 900.

As mentioned above, all or part of the inexact search process may be accelerated using the computing modules 175, 180, 185, 195, 115 in a system 100, 200, 300, 400. FIG. 20 is a block diagram illustrating a hybrid or heterogeneous system 800, in which the host computing system 105 is also involved in some of the searching. For this heterogeneous system 800, the host computing system 105 performs some initial searching, generating stack of partial matches (or hits) 775 in host memory 120. The host computing system 105 also generates a list (780) of matches having an allowable number of mismatches. For example, for the initial query processing, the host computing system 105 may generate (for each query) a sorted set of ranges into the FM-index, with each to range representing a possible partial alignment for the query sequence to the reference sequence. This can also be utilized to accommodate partial mismatches (e.g., less than "M" mismatches), with all partial results put in a stack for offloading to the one or more computing modules 175, 180, 185, 195, 115. The stack of partial matches is then complete, and can be provided to the computing modules 175, 180, 185, 195, 115, e.g., as a vector or partial results, for processing until the stack is empty and all searching using the queries has been completed.

The host computing system 105 then offloads more exact or complete matching to one or more computing modules 175, 180, 185, 195, 115, and maintains an array to keep track of multiple stacks which are searched in parallel. For example, the host computing system 105 may provide all or some of the partial hits and allowable mismatches to the computing modules 175, 180, 185, 195, 115, generally with any (BWT) SA intervals that have been calculated, and also generally transferred as a comparatively large file for efficient communication over PCIe lines 130 as discussed above. The one or more computing modules 175, 180, 185, 195, 115 process each query as discussed above, such as based upon the corresponding (BWT) SA interval generated thus far by the host computing system 105, and returns a search result to the host computing system 105, as described above, such as a complete match, a gene sequence location, etc. The host computing system 105 typically spawns two threads, one sending query data to the FPGAs 150, 160, 170 in the computing modules 175, 180, 185, 195, 115, and another reading the resulting search data from the computing modules 175, 180, 185, 195, 115. As described above, the FPGA 150, 160, 170 reads a queue having the query, typically as a single-producer, single-consumer queue for inter-thread communication, and returns the search results.

Offloading the index searching to the computing modules 175, 180, 185, 195, 115 enables multiple levels of parallel computation, which in turn improves the performance. First, multiple queries (or variations of the same query) can be sent to an FPGA 150, 160, 170 for processing at a time. In doing so, the time to compute the upper and lower index bounds is overlapped with the time to access the index. Therefore, it is more efficient to have a single FPGA 150, 160, 170 operating upon many queries at a time. The host computing system 105 simply maintains a stack (or set of stacks) for each query that is being processed by the FPGA 150, 160, 170. Second, multiple computing modules 175, 180, 185, 195, 115 can be added to the system 100, 200, 300, 400, 800 to improve performance by operating upon different queries in parallel. Since the entire FM-index is contained within the memory 190 (e.g., DDR3) of a computing module 175, 180, 185, 195, 115, all accesses to the index for a query are a local communication. This allows many computing modules 175, 180, 185, 195, 115 to be added to the system with a linear performance improvement.

The results from using the system 100, 200, 300, 400, 800 were substantial. For example, for genomic short read mapping, the system 100, 200, 300, 400, 800 showed an improvement of 48× speed up in mapping time compared to the software embodiments such as Burrows-Wheeler Aligner (BWA) software. This speedup enables researchers to receive their results much faster, thereby becoming much more efficient. Moreover, the system 100, 200, 300, 400, 800 design comes with tremendous power and area benefits. The FPGAs 150, 160, 170 in the system 100, 200, 300, 400, 800 consume a mere 120 Watts total and the entire system 100, 200, 300, 400, 800 fits inside a single 4U chassis. The power savings of a system 100, 200, 300, 400, 800 drastically reduces energy consumption costs over the lifetime of a traditional CPU cluster.

These improvements in system runtime help to enable research that was not possible before. For example, researchers can use this to study sequencing technologies with higher read error rates, which require a very large read depth during mapping. Similarly, this new technology of the present disclosure enables researchers to study larger genomes that may not have been possible before, such as barley (5.3 G bases). Also, this system 100, 200, 300, 400, 800 can be tuned for the speed versus sensitivity trade-off, which enables researchers to study genomes with large genetic variation among the species.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

A CPU or "processor" 110 may be any type of processor, and may be embodied as one or more processors 110, configured, designed, programmed or otherwise adapted to perform the functionality discussed herein. As the term processor is used herein, a processor 110 may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or $E^2$PROM. A processor (such as processor 110), with its associated memory, may be adapted or configured (via programming, FPGA interconnection, or hard-wiring) to perform the methodology of the invention, as discussed above. For example, the methodology may be programmed and stored, in a processor 110 with its associated memory (and/or memory 120) and other equivalent components, as a set of program instructions or other code (or equivalent configuration or other program) for subsequent execution when the processor is operative (i.e., powered on and functioning). Equivalently, when the processor 110 may be implemented in whole or part as FPGAs, custom ICs and/or ASICs, the FPGAs, custom ICs or ASICs also may be designed, configured and/or hard-wired to implement the methodology of the invention. For example, the processor 110 may be implemented as an arrangement of analog and/or digital circuits, controllers, microprocessors, DSPs and/or ASICs, collectively referred to as a "processor", which are respectively hard-wired, programmed, designed, adapted or configured to implement the methodology of the invention, including possibly in conjunction with a memory 120.

The memory 120, 140, 190, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 110), whether volatile or non-volatile, whether removable or non-removable, including without limitation RAM, FLASH, DRAM, SDRAM, SRAM, MRAM, FeRAM, ROM, EPROM or E$^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 120, 140, 190 may be adapted to store various look up tables, parameters, coefficients, other information and data, programs or instructions (of the software of the present invention), and other types of tables such as database tables.

As indicated above, the processor 110 is hard-wired or programmed, using software and data structures of the invention, for example, to perform the methodology of the present invention. As a consequence, the system and method of the present invention may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 110, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 120, 140, 190, e.g., a floppy disk, a CDROM, a CD-RW, a DVD, a magnetic hard drive, an optical drive, or any other type of data storage apparatus or medium, as mentioned above.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used to in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for inexact search acceleration in a system using reference data, the system having at least one host computing system, one or more field programmable gate arrays, and one or more memory circuits, the method comprising:

using the one or more field programmable gate arrays, selecting a query from a plurality of queries, each query comprising a sequence of a plurality of characters;

using the one or more field programmable gate arrays, selecting a first or next substring of the selected query, the first or next substring comprising a subsequence of characters of the selected query;

using the one or more field programmable gate arrays, reading a first or next section of an FM-index of the reference data from the one or more memory circuits and calculating a plurality of suffix array intervals for the first or next sub string with a corresponding plurality of prepended characters in a first or next position;

using the one or more field programmable gate arrays, reading a first or next character in the first or next position of the query and selecting a first or next suffix array interval of the plurality of suffix array intervals for the read first character;

using the one or more field programmable gate arrays, determining whether the first or next suffix array interval is valid and whether a beginning of the query has been reached;

using the one or more field programmable gate arrays, when the first or next suffix array interval is valid and the beginning of the query has been reached, returning a first search result; and using the one or more field programmable gate arrays, when the first or next suffix array interval is not valid, returning a second search result that no match of the query with the reference data was found.

2. The method of claim 1, wherein the first search result is the valid first or next suffix array interval.

3. The method of claim 1, wherein the first search result is an alignment of the query with the reference data.

4. The method of claim 1, wherein the reference data is a reference genetic sequence and the first search result is an alignment location of a short read query with the reference genetic sequence.

5. The method of claim 1, further comprising:
using the one or more field programmable gate arrays, when the first or next suffix array interval is valid and the beginning of the query has not been reached, reading a next section of an FM-index from the memory circuit and calculating a next plurality of suffix array intervals for a next sub string with a corresponding plurality of prepended characters in a next position; reading a next character in the next position of the query and selecting a next suffix array interval of the next plurality of suffix array intervals for the read next character; and determining whether the next suffix array interval is valid and whether a beginning of the query has been reached.

6. The method of claim 1, further comprising:
using the one or more field programmable gate arrays, when the first or next suffix array interval is not valid, modifying the query with up to a predetermined number of a plurality of character mismatches.

7. The method of claim 1, further comprising:
using the host computing system, when the first or next suffix array interval is not valid, modifying the query with up to a predetermined number of a plurality of character mismatches.

8. The method of claim 7, wherein the plurality of character mismatches comprise at least one character mismatch selected from the group consisting of: a character insertion, a character deletion, or a character substitution.

9. The method of claim 1, further comprising:
using the one or more field programmable gate arrays, converting the valid first or next suffix array interval to an alignment of the query with the reference data.

10. The method of claim 1, wherein the determination of whether the first or next suffix array interval is valid further comprises:
using the one or more field programmable gate arrays, determining whether a difference between an upper bound "l" of the first or next suffix array interval and a lower bound "k" of the first or next suffix array interval is greater than or equal to one (1).

11. The method of claim 9, wherein the determination of the upper and lower bounds further comprises:
using the one or more field programmable gate arrays, computing $k=C(a)+O(a, k-1)+1$ and computing $l=C(a)+O(a, l)$;
wherein C(a) is a count array having a number of characters in the reference data string which are lexicographically smaller than "a" and wherein O(a,i) is an occurrence array having a count of a number of occurrences of "a" in the first "i" characters of a Burrows-Wheeler Transform string of the FM-index.

12. The method of claim 1, further comprising:
using the host computing system, performing an initial search using the query and generating a plurality of partial query matches with the reference data.

13. The method of claim 1, further comprising:
using the host computing system, generating the FM-index by creating a suffix array and a Burrows-Wheeler Transform string.

14. The method of claim 13, further comprising:
using the host computing system, generating a count array having a number of characters in the reference data string which are lexicographically smaller than "a"; and
using the host computing system, generating an occurrence array having a count of a number of occurrences of "a" in the first "i" characters of the Burrows-Wheeler Transform string of the FM-index.

15. The method of claim 1, further comprising:
using a plurality of the one or more field programmable gate arrays, performing the selecting, reading, calculating, determining and returning steps in parallel.

16. The method of claim 1, further comprising:
using the host computing system, partitioning the plurality of queries for parallel searching using a plurality of the one or more field programmable gate arrays.

17. A system for inexact search acceleration using reference data, the system coupled to a host computing system, the system comprising:
one or more memory circuits storing a plurality of queries and a FM-index of the reference data, each query comprising a sequence of a plurality of characters; and
one or more field programmable gate arrays coupled to the one or more memory circuits, the one or more field programmable gate arrays configured to select a query from the plurality of queries; select a first or next substring of the selected query, the first or next substring comprising a subsequence of characters of the selected query;
read a first or next section of the FM-index from the one or more memory circuits and calculate a plurality of suffix array intervals for the first or next sub string with a corresponding plurality of prepended characters in a first or next position; read a first or next character in the first or next position of the query and select a first or next suffix array interval of the plurality of suffix array intervals for the read first character;
determine whether the first or next suffix array interval is valid and whether a beginning of the query has been reached; return a first search result when the first or next suffix array interval is valid and the beginning of the query has been reached, the first search result comprising an alignment of the query with the reference data or comprising the valid first or next suffix array interval; and return a second search result that no match of the query with the reference data was found when the first or next suffix array interval is not valid.

18. The system of claim 17, wherein the reference data is a reference genetic sequence and the first search result is an alignment location of a short read query with the reference genetic sequence.

19. The system of claim 17, wherein the one or more field programmable gate arrays are further configured, when the first or next suffix array interval is valid and the beginning of the query has not been reached, to read a next section of the FM-index from the one or more memory circuits and calculate a next plurality of suffix array intervals for a next sub string with a corresponding plurality of prepended characters in a next position; read a next character in the next position of the query and select a next suffix array interval of the next plurality of suffix array intervals for the read next character; and determine whether the next suffix array interval is valid and whether a beginning of the query has been reached.

20. The system of claim 17, wherein the host computing system is adapted to modify the query with up to a predetermined number of a plurality of character mismatches when the first or next suffix array interval is not valid, wherein the plurality of character mismatches comprise at least one character mismatch selected from the group consisting of: a character insertion, a character deletion, or a character substitution.

21. The system of claim 17, wherein the one or more field programmable gate arrays are further configured to convert the valid first or next suffix array interval to an alignment of the query with the reference data.

22. The system of claim 17, wherein the one or more field programmable gate arrays are further configured to determine whether a difference between an upper bound "l" of the first or next suffix array interval and a lower bound "k" of the first or next suffix array interval is greater than or equal to one (1) to determine whether the first or next suffix array interval is valid, wherein the one or more field programmable gate arrays are further configured to compute k=C(a)+O(a, k−1)+1 and compute l=C(a)+O(a, l); wherein C(a) is a count array having a number of characters in the reference data string which are lexicographically smaller than "a" and wherein O(a,i) is an occurrence array having a count of a number of occurrences of "a" in the first "i" characters of a Burrows-Wheeler Transform string of the FM-index.

23. The system of claim 17, wherein the host computing system is adapted to perform an initial search using the query and generating a plurality of partial query matches with the reference data.

24. The system of claim 17, wherein the host computing system is adapted to generate the FM-index by creating a suffix array and a Burrows-Wheeler Transform string; to generate a count array having a number of characters in the reference data string which are lexicographically smaller than "a"; and to generate an occurrence array having a count of a number of occurrences of "a" in the first "i" characters of a Burrows-Wheeler Transform string of the FM-index.

25. The system of claim 17, wherein the one or more field programmable gate arrays are further configured to select, read, calculate, determine and return search results in parallel using a plurality of partitions of the plurality of queries for parallel searching.

26. A method for inexact search acceleration in a system using reference data, the system having at least one host computing system, one or more field programmable gate arrays, and one or more memory circuits, the method comprising:

using the one or more field programmable gate arrays, selecting a query from a plurality of queries, each query comprising a sequence of a plurality of characters;

using the one or more field programmable gate arrays, selecting a first or next substring of the selected query, the first or next substring comprising a subsequence of characters of the selected query;

using the one or more field programmable gate arrays, reading a first or next section of an FM-index of the reference data from a memory circuit and calculating a plurality of suffix array intervals for the first or next sub string with a corresponding plurality of prepended characters in a first or next position;

using the one or more field programmable gate arrays, reading a first or next character in the first or next position of the query and selecting a first or next suffix array interval of the plurality of suffix array intervals for the read first character;

using the one or more field programmable gate arrays, determining whether the first or next suffix array interval is valid and whether a beginning of the query has been reached;

using the one or more field programmable gate arrays, when the first or next suffix array interval is valid and the beginning of the query has not been reached, reading a next section of the FM-index from the memory circuit and calculating a next plurality of suffix array intervals for a next sub string with a corresponding plurality of prepended characters in a next position; reading a next character in the next position of the query and selecting a next suffix array interval of the next plurality of suffix array intervals for the read next character; and determining whether the next suffix array interval is valid and whether a beginning of the query has been reached;

using the one or more field programmable gate arrays, when the first or next suffix array interval is valid and the beginning of the query has been reached, returning a first search result with an alignment of the query with the reference data; and using the one or more field programmable gate arrays, when the first or next suffix array interval is not valid, returning a second search result with no alignment of the query with the reference data.

* * * * *